(12) United States Patent
Wiese

(10) Patent No.: US 8,155,797 B2
(45) Date of Patent: Apr. 10, 2012

(54) WINDOW FAN CONTROL SYSTEM AND METHOD OF CONTROLLING A FAN UNIT

(76) Inventor: James Wiese, Maple Grove, MN (US)

( * ) Notice: Subject to any disclaimer, the term of this patent is extended or adjusted under 35 U.S.C. 154(b) by 254 days.

(21) Appl. No.: 12/540,080

(22) Filed: Aug. 12, 2009

(65) Prior Publication Data
US 2011/0040412 A1    Feb. 17, 2011

(51) Int. Cl.
*G05D 23/00* (2006.01)
(52) U.S. Cl. .................................. 700/300; 700/278
(58) Field of Classification Search .......... 700/276–278, 700/299–300
See application file for complete search history.

(56) References Cited

U.S. PATENT DOCUMENTS

| | | | |
|---|---|---|---|
| 1,153,067 A | 9/1915 | Hackney | |
| 2,010,808 A | 8/1935 | Braine | |
| 2,036,851 A | 4/1936 | Chittenden | |
| 2,218,330 A | 10/1940 | Eliason | |
| 2,337,325 A | 12/1943 | Hach et al. | |
| 2,373,497 A | 4/1945 | Paiste, Jr. | |
| 2,456,391 A | 12/1948 | Davies | |
| 2,559,495 A | 7/1951 | Calkins | |
| 2,750,868 A | 6/1956 | Mieczkowski et al. | |
| 3,120,340 A | 2/1964 | Strumpell | |
| 3,275,224 A | 9/1966 | Bush | |
| 3,315,587 A | 4/1967 | Horan | |
| 3,478,817 A | 11/1969 | Shaw | |
| 3,500,738 A | 3/1970 | Wenig | |
| 3,570,386 A | 3/1971 | Baumann et al. | |
| 4,865,118 A | 9/1989 | Moland | |
| 5,000,381 A | 3/1991 | Mueller et al. | |
| 5,065,585 A | 11/1991 | Wylie et al. | |
| 5,135,045 A | 8/1992 | Moon | |
| 5,190,496 A * | 3/1993 | Shih-Chin | ...................... 454/210 |
| 5,637,039 A | 6/1997 | Chiu et al. | |
| 5,660,586 A | 8/1997 | Chiu et al. | |
| 5,660,605 A | 8/1997 | Can et al. | |
| 5,664,996 A | 9/1997 | Wang et al. | |
| 5,730,651 A | 3/1998 | Chen et al. | |
| D402,359 S | 12/1998 | Wang et al. | |
| 5,902,183 A | 5/1999 | D'Souza | |
| D425,978 S | 5/2000 | Cunning | |
| 6,328,095 B1 | 12/2001 | Felber et al. | |
| 6,818,035 B2 | 11/2004 | McGahey, Jr. | |
| 7,083,110 B2 | 8/2006 | Kim et al. | |
| 7,238,105 B2 | 7/2007 | Reinders | |
| 7,270,600 B2 | 9/2007 | Kim et al. | |
| 2002/0039529 A1 | 4/2002 | Kim | |

(Continued)

*Primary Examiner* — Kakali Chaki
*Assistant Examiner* — Nathan Laughlin
(74) *Attorney, Agent, or Firm* — Scott W. Higdon; James Cole; Middleton Reutlinger

(57) ABSTRACT

In the specification and drawings a window fan control system and a method of controlling a fan unit are described and shown. The window fan control system may comprise an electronic controller, an indoor sensor responsive to at least one characteristic of interior air, and an outdoor sensor responsive to at least one characteristic of exterior air. The electronic controller may cause at least one fan of a window fan to be activated when the interior air meets certain criteria relative to a set point and the exterior air meets certain preselected criteria relative to the interior air. The method of controlling a fan unit may comprise the steps of measuring at least one characteristic of exterior air, measuring at least one characteristic of interior air, and activating an intake fan of the fan unit when the interior air meets certain criteria relative to a set point and the exterior air meets certain preselected criteria relative to the interior air.

13 Claims, 20 Drawing Sheets

U.S. PATENT DOCUMENTS

| | | | |
|---|---|---|---|
| 2006/0168972 A1* | 8/2006 | Fry | 62/157 |
| 2006/0273183 A1 | 12/2006 | Cavanagh et al. | |
| 2007/0264927 A1 | 11/2007 | Choi et al. | |
| 2009/0101727 A1* | 4/2009 | Boudreau | 236/44 C |
| 2009/0134231 A1 | 5/2009 | Matsui | |
| 2009/0242651 A1* | 10/2009 | Ha et al. | 236/51 |

* cited by examiner

WINDOW FAN CONTROL SYSTEM AND METHOD OF CONTROLLING A FAN UNIT

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

This invention relates to a window fan control system and a method of controlling a fan unit.

2. Description of the Related Art

Prior art window fans are utilized to move stagnant air, cool internal building areas or rooms when air conditioning is not available. There are various known problems however, with prior art fan structures. First, as depicted in FIG. 15, prior art fans in many cases only pull air into a room and fail to exhaust air which causes poor circulation within the room and therefore hinders cooling. Alternatively, other fan systems pull air into a room and exhaust air in the same vertical plane or elevation. Therefore these fan systems fail to eliminate temperature stratification and reduce cooling effectiveness.

Another problem related to prior art fans is that fan units do no inhibit water passing through a housing and into a room when the fan is operated while a rain event is occurring. Consequently, during rain events, many window fans may not be operated without drawing water into the building.

Another problem with prior art window units is the limited control of fan operation. Most prior art units are manually operated, meaning a user must turn the fan on and off as desired. It would be desirable to use a window fan when specific outside air criteria are met, so that the air conditioning system in the building or home is not needed when the outside air is cool and of a saturation or humidity level which would be comfortable to an occupant of the building or room.

Additionally, the use of the dew point and humidity controls would allow for increased comfort and energy savings by limiting the use of air conditioning in the building or home. Such limited use of natural resources is desirable.

It would be desirable to create a window fan unit which overcomes these and other deficiencies in order to decrease energy consumption, more efficiently cool interior areas of a building, commercial, residential or other, and improve occupant comfort while ultimately saving money on cooling by using outside air where applicable.

SUMMARY

A control system for a window fan is disclosed. In some embodiments the window fan may have a fan for communicating air between an interior area having interior air and an exterior area having exterior air. In some embodiments the control system may include an electronic controller in electrical communication with the fan. The control system may also include a control panel having a user selectable set point input that is in electrical communication with the electronic controller and provides a user selected set point to the electronic controller. The control system may also include an indoor sensor located so as to be responsive to at least one characteristic of the interior air. The indoor sensor may be in electrical communication with the electronic controller and communicate the at least one characteristic of the interior air to the electronic controller. The control system may also include an outdoor sensor located so as to be responsive to at least one characteristic of the exterior air. The outdoor sensor may be in electrical communication with the electronic controller and communicate the at least one characteristic of the exterior air to the electronic controller. The window fan may be operable in an automatic mode, wherein in the automatic mode the electronic controller causes the fan to be activated when: the at least one characteristic of the interior air indicates a dry bulb temperature of the interior air is greater than the set point; the at least one characteristic of the exterior air indicates a dry bulb temperature of the exterior air is less than the dry bulb temperature of the interior air; and the at least one characteristic of the exterior air indicates a dew point of the exterior air is less than a dew point of the interior air as indicated by the at least one characteristic of the exterior air.

The fan of the control system may be driven at variable speeds. The speed of the fan may correspond to a differential between the set point and the indoor dry bulb temperature. The control system may further comprise a second fan, wherein the second fan is an exhaust fan for expelling the interior air into an exterior area and wherein the fan is an intake fan for drawing exterior air into an interior area, and wherein the speed of the second fan corresponds to a differential between the set point and the indoor dry bulb temperature. The control system fan and the second fan may be driven at low, medium, and high speeds. The electronic controller may cause the fan and the second fan to be operated at the low speed when the differential between the set point and the indoor dry bulb temperature is within a first range, the fan and the second fan to be operated at the medium speed when the differential between the set point and the indoor dry bulb temperature is within a second range greater than the first range, and the fan and the second fan to be operated at the high speed when the differential between the set point and the indoor dry bulb temperature is within a third range greater than the second range. The second fan may be disposed vertically above the fan when the window fan is installed.

A method of controlling a fan unit installable in an opening between an interior area and an exterior area is also disclosed. In some embodiments the fan unit may have an intake fan for drawing exterior air into a building interior. In some embodiments the method may include the steps of: providing an input device to allow a user to select a set point indicative of a minimum desired temperature of interior air; measuring at least one characteristic of the exterior air; measuring at least one characteristic of the interior air; and activating the intake fan when: the at least one characteristic of the interior air indicates a dry bulb temperature of the interior air is above the set point, the at least one characteristic of the exterior air indicates a dry bulb temperature of the exterior air is less than the dry bulb temperature of the interior air, and the at least one characteristic of the exterior air indicates a dew point of the exterior air is less than a dew point of the interior air as indicated by the at least one characteristic of the interior air.

In the method of controlling a fan unit at least one characteristic of the interior air may include an interior relative humidity measurement and at least one characteristic of the exterior air may include an exterior relative humidity measurement. In the method of controlling a fan unit the intake fan may be a variable speed fan and the step of activating the intake fan may further include determining a difference between the set point and the indoor dry bulb temperature and activating the intake fan at a first speed when the difference between the set point and the indoor dry bulb temperature is within a first range of numbers and activating the intake fan at a second speed greater than the first speed when the difference between the set point and the indoor dry bulb temperature is within a second range of numbers, wherein the second range of numbers contains numbers larger than the first range of numbers. The method may further comprise the step of deactivating the intake fan when the at least one characteristic of the interior air indicates a dry bulb temperature of the interior air is less than or equal to the set point. The method may further comprise the step of deactivating the intake fan when the at least one characteristic of the interior air indicates a dry bulb temperature of the interior air is less than the set point.

In the method the fan unit may be an air conditioning unit that includes a housing having an exterior side for positioning in the exterior area and an interior side for positioning in the interior area. The air conditioning unit may further include a compressor and the method may comprise the step of deactivating the compressor when: the at least one characteristic of the interior air indicates a dry bulb temperature of the interior air is above the set point, the at least one characteristic of the exterior air indicates a dry bulb temperature of the exterior air is less than the dry bulb temperature of the interior air, and the at least one characteristic of the exterior air indicates a dew point of the exterior air is less than a dew point of the interior air as indicated by the at least one characteristic of the interior air.

In some embodiments of the method of controlling a fan unit, the fan unit may have an intake fan for drawing exterior air through the fan unit into a building interior, an exhaust fan for expelling interior air through the fan unit into an exterior, and at least one louver assembly for selectively inhibiting airflow through the fan unit. In some embodiments the method may include the steps of: allowing a user to select a set point indicative of a minimum desired temperature of interior air; measuring at least one characteristic of the exterior air; measuring at least one characteristic of the interior air; activating the intake fan, activating the exhaust fan, and opening the at least one louver assembly to allow airflow through the fan unit when: the at least one characteristic of the interior air indicates a dry bulb temperature of the interior air is above the set point, the at least one characteristic of the exterior air indicates a dry bulb temperature of the exterior air is less than the dry bulb temperature of the interior air, and the at least one characteristic of the exterior air indicates a dew point of the exterior air is less than a dew point of the interior air as indicated by the at least one characteristic of the interior air.

In the method of controlling a fan unit the intake fan and the exhaust fan may be variable speed fans. In the method, the step of activating the intake fan and the exhaust fan may further include determining a difference between the set point and the indoor dry bulb temperature and activating the intake fan and the exhaust fan at a first speed when the difference between the set point and the indoor dry bulb temperature is within a first range of numbers and activating the intake fan and the exhaust fan at a second speed greater than the first speed when the difference between the set point and the indoor dry bulb temperature is within a second range of numbers, wherein the second range of numbers contains numbers larger than the first range of numbers. The method may further comprise the step of deactivating the intake fan, deactivating the exhaust fan, and closing the at least one louver when the at least one characteristic of the interior air indicate a dry bulb temperature of the interior air is less than the set point. The method may further comprise the step of deactivating the intake fan when the at least one characteristic of the interior air indicate a dry bulb temperature of the interior air is less than the set point.

In the method the fan unit may be an air conditioning unit that includes a housing having an exterior side for positioning in the exterior area and an interior side for positioning in the interior area. The air conditioning unit may further include a compressor and the method may further comprise the step of deactivating the compressor when: the at least one characteristic of the interior air indicates a dry bulb temperature of the interior air is above the set point, the at least one characteristic of the exterior air indicates a dry bulb temperature of the exterior air is less than the dry bulb temperature of the interior air, and the at least one characteristic of the exterior air indicates a dew point of the exterior air is less than a dew point of the interior air as indicated by the at least one characteristic of the interior air.

In the method the at least one characteristic of the interior air may include an interior relative humidity measurement and the at least one characteristic of the exterior air may include an exterior relative humidity measurement. The at least one characteristic of the interior air may include an interior dry bulb temperature measurement and the at least one characteristic of the exterior air may include an exterior dry bulb temperature measurement; an interior dew point may be calculated from the interior dry bulb temperature measurement and the interior relative humidity measurement; an exterior dew point may be calculated from the exterior dry bulb temperature measurement and the exterior relative humidity measurement; and the interior dew point may be compared to the exterior dew point to thereby determine if the dew point of the exterior air is less than the dew point of the interior air. The at least one characteristic of the interior air may include an interior dry bulb temperature measurement and the at least one characteristic of the exterior air may include an exterior dry bulb temperature measurement; an interior specific humidity level may be calculated from the interior dry bulb temperature measurement and the interior relative humidity measurement; an exterior specific humidity level may be calculated from the exterior dry bulb temperature measurement and the exterior relative humidity measurement; and the exterior specific humidity level may be compared to the specific humidity level to thereby indirectly determine if the dew point of the exterior air is less than the dew point of the interior air.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
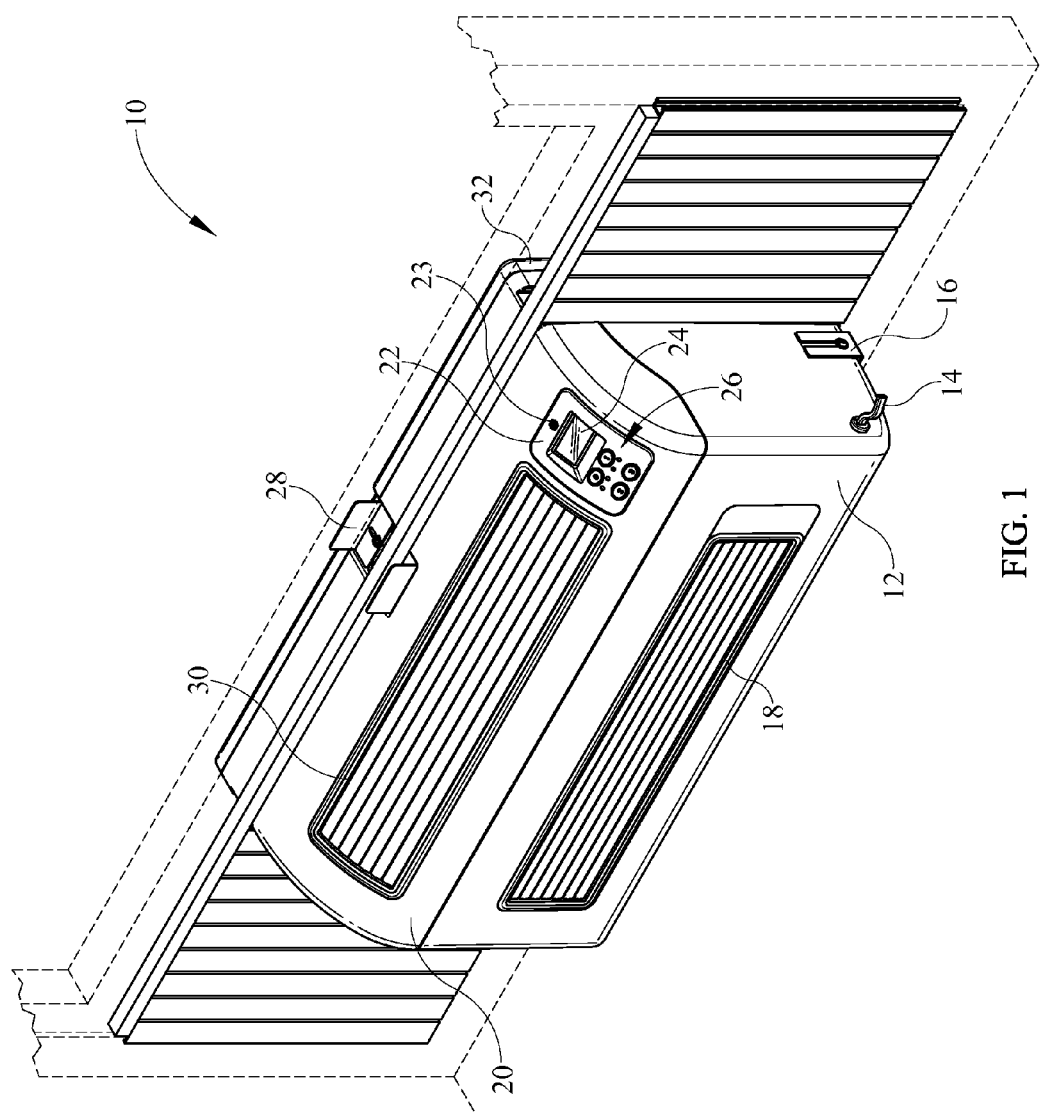
FIG. 1 is a perspective view of a window fan system positioned in a window sill for use.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

Referring now to the drawings wherein like numerals indicate like elements throughout the several views that are shown in FIGS. 1-20 various aspects of a window fan system. The window fan system inhibits rain passage through the housing and dispels the rain without the water content entering the interior area of the building. The window fan unit also comprises a damper or louver system to open and close vents to limit heat transfer through the system when the fans are turned off. Additionally, the fan unit has a ducting arrangement which pulls air into a room and exhausts air from the room to improve circulation and utilizes a fan arrangement to aid with the circulation. The fan system also utilizes a control system to utilize outside air having desirable characteristics which cools the room and may be also used with existing air conditioning, therefore decreasing the reliance on an air conditioning system, and saving energy and costs associated with air conditioning operation.

Referring now to FIG. 1, a perspective view of a window fan system 10 is depicted on a window sill and with a window sash (both shown in broken line) engaging an upper surface of the window fan system 10. Positioned about the lower portion of the fan system 10 is a lower housing 12 which wraps around the front and sides of the fan system 10 and may be formed of metal, plastic or other resilient material and which has aesthetically pleasing qualities. A power cord 14 is shown extending from a side of the lower housing 12 and may extend to a power supply such as an in-wall power outlet (not shown). Adjacent to power cord 14 is a sill bracket 16 which allows for adjustable connection to the window sill wherein the window fan system 10 is positioned. Although a sash type window is depicted, it should be understood that use of the window fan system 10 may be used with slider type window which slides in a horizontal direction rather than a vertical direction.

Within the lower housing 12 is an outside air exhaust 18. When outside air is entrained into the fan system 10 and passes through at least one fan within the window fan system 10, the outside air is exhausted into the building or room through the outside air exhaust 18. The outside air exhaust 18 is positioned on the lower area of the housing so that an upper intake 30 can remove hotter air from the room. The outside air exhaust 18 may be opened or closed to allow or inhibit airflow into the room or area being cooled.

Above the lower housing 12 is an upper housing 20 which may also be formed of metal, plastic or other resilient material like the lower housing 12 and may be matching. The upper and lower housings 20, 12 of the exemplary embodiment are depicted as separate housing pieces, however, such housing elements 12, 20 may be combined into a single one-piece housing. Additionally, the upper housing 20 comprises a control panel 22 having a display 24 and at least one control button 26. Adjacent to the control panel 22 is a room exhaust intake 30. The window fan system 10 also exhausts air from inside the building to outside in order to improve circulation within the room or building. Thus, cooler air comes into the building through the outside air exhaust 18 and hotter air is withdrawn from the room through the upper room exhaust intake 30. With the room exhaust intake 30 on the upper surface of the window fan system 10, the room exhaust intake 30 can better draw warm air from the room and move it outside. Conversely, the outside air exhaust 18 is at a lower position, as this air is cooler than the warmer air being exhausted by the room exhaust intake 30. This configuration aids circulation since warm air rises and cooler air descends.

The surrounding window structure is shown in broken line to provide environmental understanding of how the window fan system 10 is placed in the window and when the sash is closed against the upper surface of the upper housing 20. Positioned on the upper housing 20 is an adjustable sash bracket 28. This bracket provides an adjustable width to fit various sizes of window sash. The bracket 28 also provides adjustability to compensate for the position the window fan 10 is inwardly or outwardly relative to the window sill beneath the system 10. For example, some windows will require further positioning of the system 10 toward the interior of the building than other windows. The sash bracket 28 also aids to compensate for such adjustments.

Figure 2:
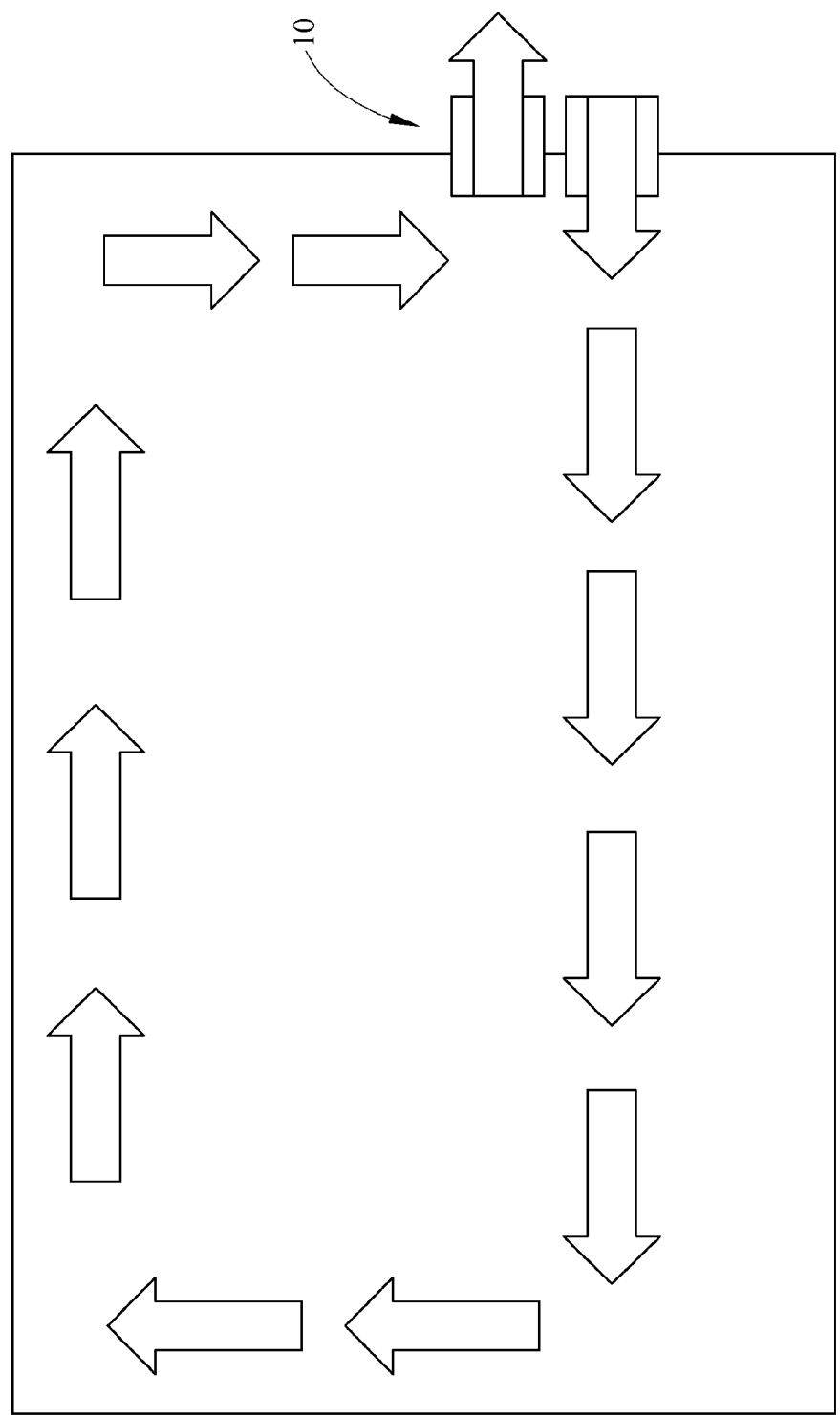
FIG. 2 is a side schematic view of a room circulation pattern showing both intake into and exhaust from the room.

Referring now to FIG. 2, a side schematic view of a room is depicted. A window fan system 10 is depicted in a sidewall of the room. A lower fan draws air into the room which circulates across the room, up an opposite wall, along the ceiling and down the wall in which the window fan unit 10 is positioned. Additionally, it will be understood that the air moving into the room may move along the walls toward the window fan system 10. As the air moves along the walls toward the system 10, any rising temperature of the air will cause the air to rise nearer the fan system 10. A second upper fan draws air from within the room and out to atmosphere. As previously indicated, the upper fan is utilized to draw air from the room since warmer air will be higher in the room. In comparison with FIG. 15, one of skill in the art will recognize that where the prior art device fails by not removing air from the interior, the instant embodiment removes warmer air increasing circulation, which ultimately aids in cooling the room. The vertical circulation pattern created by the fan system 10 eliminates temperature stratification of prior art devices with air intake and air exhaust both in the same vertical elevation Referring now to FIG. 3, a rear perspective view of the window fan system 10 is depicted. The rear side of the window fan system 10 is positioned on the outside of the building being cooled both drawing air into the room and exhausting air out of the room. With the upper housing 20, the lower housing 12 and the rear louver 32 all removed, a frame 40 is revealed. The frame 40 comprises a first side member 41 and a second opposed side member 43. Both the first side member 41 and the second side member 43 are vertical members and substantially parallel to one another in the exemplary embodiment although such design should not be considered limiting. Along the upper side of the frame 40 and connecting the first side member and second side member 41,43 is an upper frame member 42. The upper frame member 42 is substantially horizontal and opposite to an opening 44 which is defined by a first strut 45 and an opposed second strut 46. Around the mid-portion of the frame 40, in a vertical direction is a partition 38 which separates the upper exhaust portion 50 from the lower intake portion 52 of the window fan system 10. On the upper side of the fan partition 38, is an upper fan housing 54. Beneath the partition 38 in the lower intake portion 52 is a lower fan housing 56. Each of the housings 54, 56 may be formed of one or more housing portions which are connected in various manners or alternatively may be formed integrally.

Figure 3:
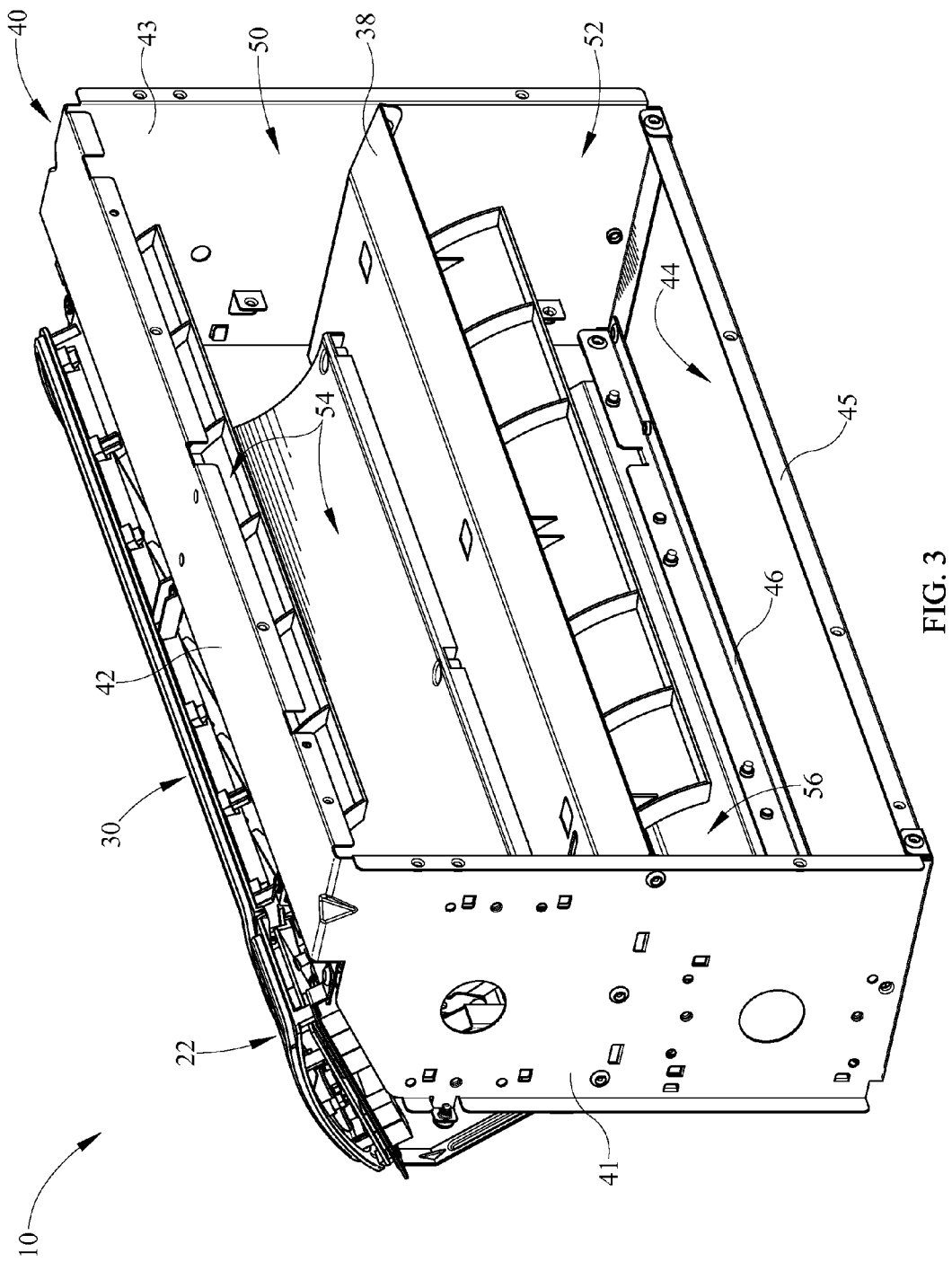
FIG. 3 is a rear perspective view of the window fan system with the housing structure removed.
Figure 4:
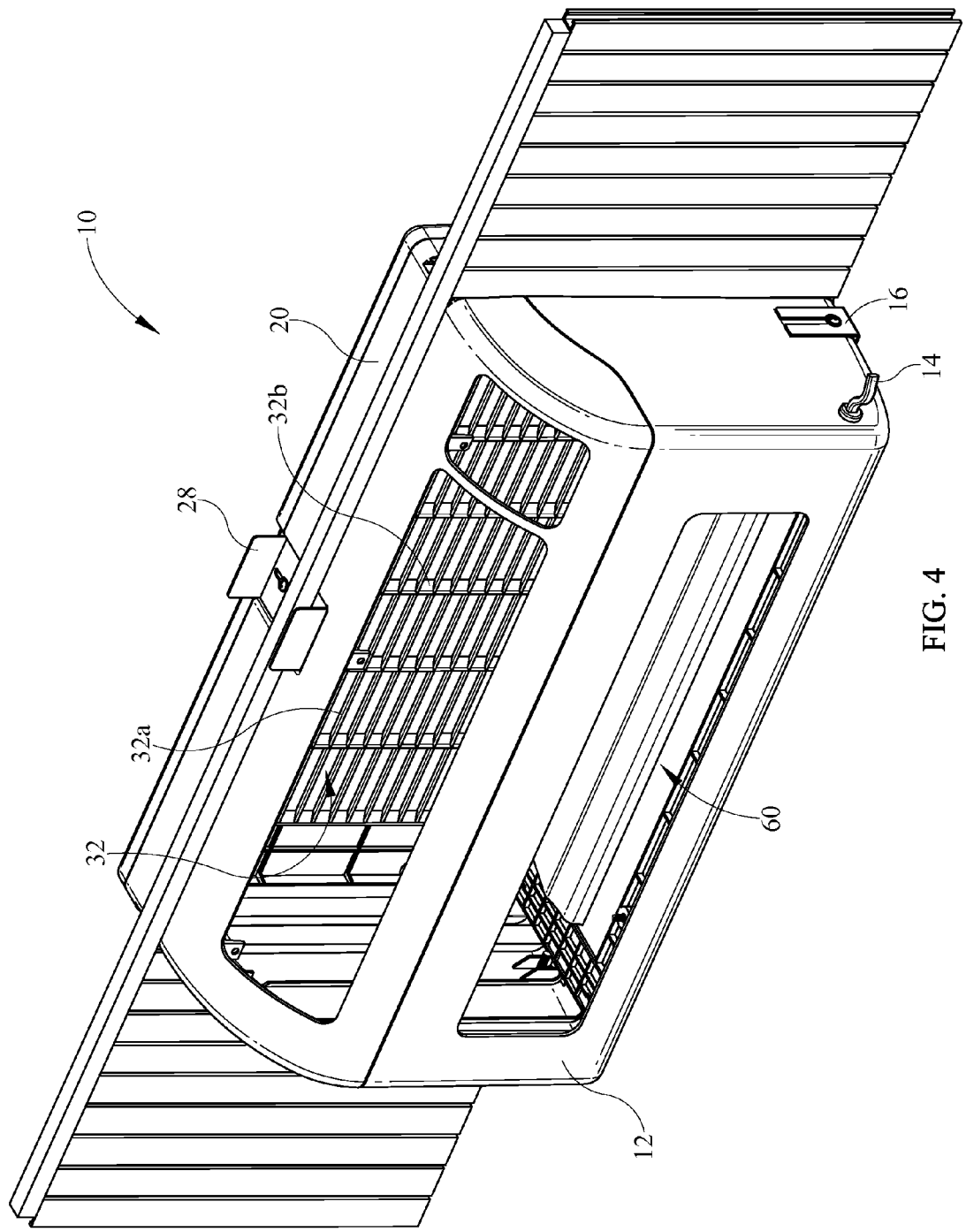
FIG. 4 is a perspective view of the housing of the window fan system with much of the internal structure removed.

Referring now to FIG. 4, a perspective view of a window fan system 10 is depicted with the internal components of the system 10 removed. Through the openings of the upper housing 20, the rear louver 32 may be seen which is positioned on the outwardly facing side of the window fan system 10. The rear louver 32 covers the upper exhaust portion 50 and the lower intake portion 52 (FIG. 3). These portions 50,52 are separated by the partition 38 (FIG. 2) so as to create two separate air pathways. The lower intake portion 52 pulls outside air into the system 10 directs the air into the building or home through the outside air exhaust 18. The upper exhaust portion 50 pulls air from the room or building interior through the room exhaust intake 30 and directs this warmer air out of the upper half of the rear louver 32.

Within the lower area of the system 10, a dam 60 may be seen adjacent the rear louver 32. The dam 60 is located generally between the first and second struts 45, 46 (FIG. 2). The dam 60 may be separately formed and positioned between the struts 45,46 or, alternatively the dam 60 may be integrally formed with lower housing portion 12, frame 40, or other portions of the fan system 10. In either formation, the dam 60 inhibits water passage through the fan system 10. Water passing through the lower portion of rear louver 32 encounters the dam 60 as it moves into or toward the lower intake portion 52. The dam inhibits the water droplet from passing though the housing and into the room. The dam 60 performs this function by creating a reservoir for water droplets which fall out of the airstream being pulled into the housing. In other words, the dam 60 effectuates removal from the entrained water droplets from the airflow. Afterward, the fallen water droplets are gravity fed to a well 62 (FIG. 6) where the water may drain through the housing and out of the system 10 and may be aided by the lower fan at the bottom of the fan blade.

Figure 5:
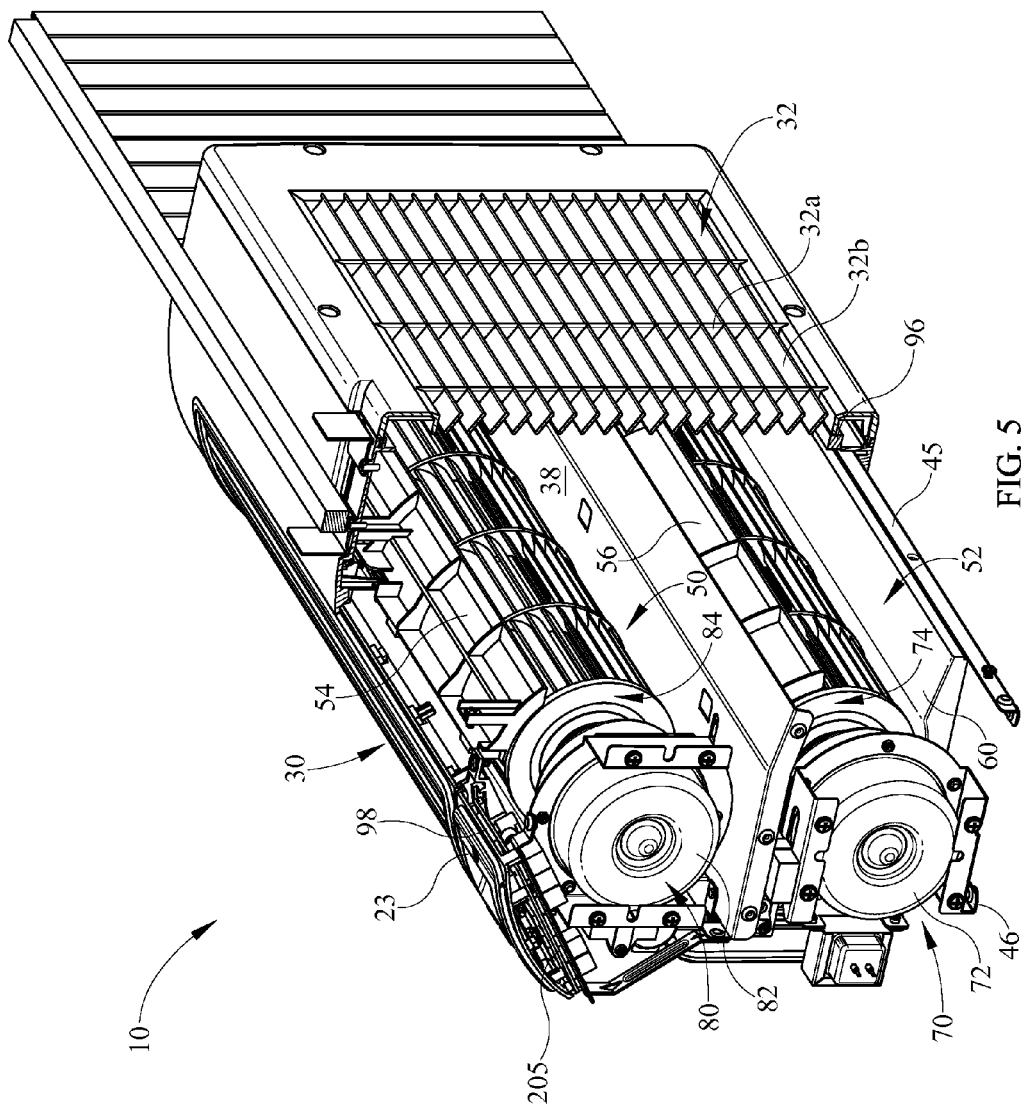
FIG. 5 is a partially sectioned perspective view of the window fan system.
Figure 6:
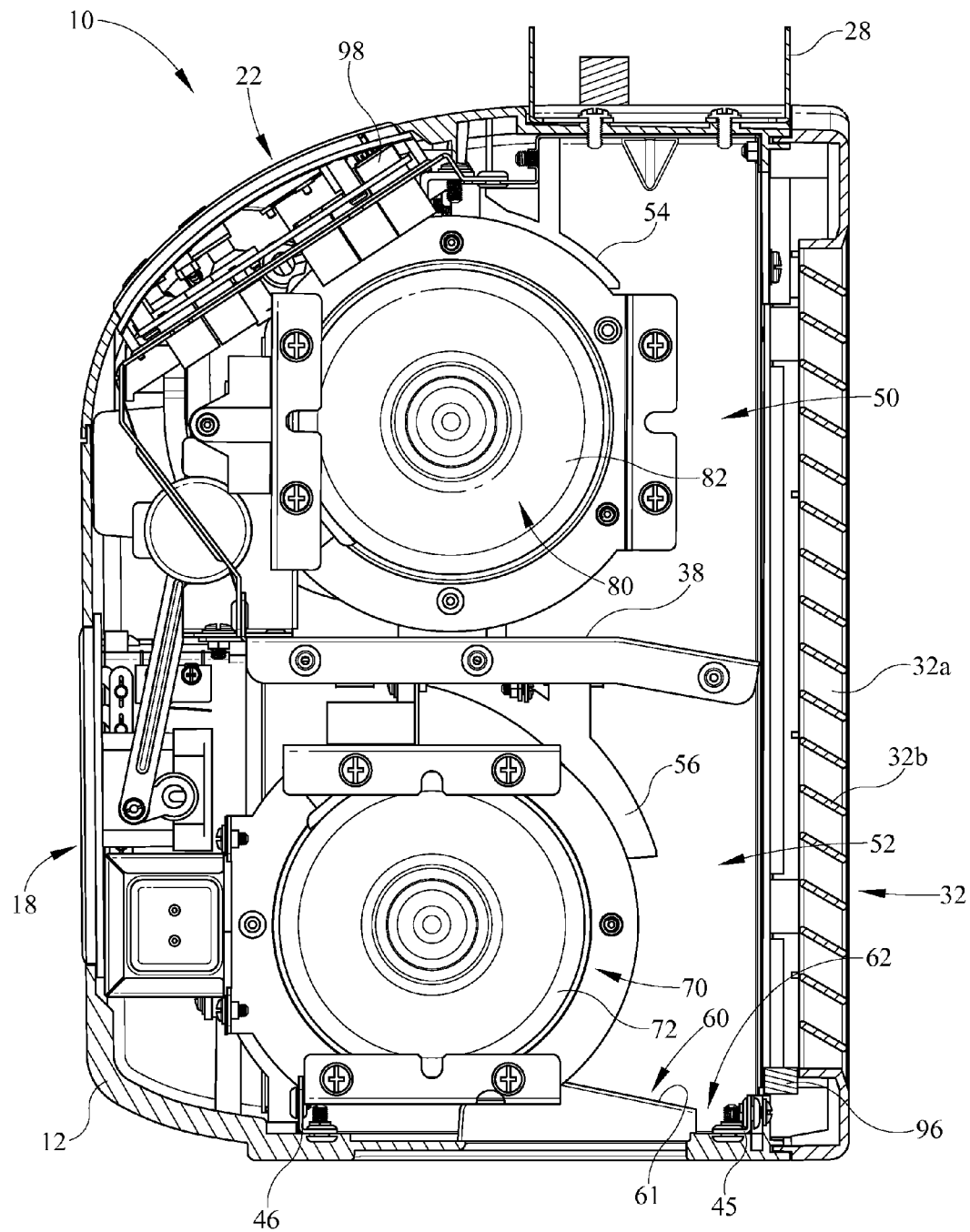
FIG. 6 is a side section view of the window fan system.

Referring now to FIGS. 5 and 6, a partially sectioned rear perspective view and side sectioned view of the window fan unit 10 are depicted. The rear louver 32 comprises a plurality of vertical fins 32a and a plurality of horizontally extending fins 32b. The horizontally extending fins 32b are tilted at an angle which slopes downward from the inside of the system 10 to the outside. The fins 32a, 32b are fixed and are sloped in order to deflect rain which might otherwise be pulled into the lower half of the louver 32 and into the lower intake portion 52. According to the exemplary embodiment, the slope of the horizontal fins is 5%, although such slope should not be considered limiting as other slopes may be utilized. Additionally, an aspect ratio of the rear louver 32 is defined as being about two-to-one (2:1). The term aspect ratio means that, as measured between vertical fins 32a, the width of the horizontal fin 32b is twice the vertical distance between louvers. Again this aspect ratio is merely exemplary, as other ratios may be utilized. The illustrative aspect ratio is utilized also for its ability to deflect rain which may be entrained near the lower intake portion 52 of the louver 32.

From this view, one skilled in the art will realize that the upper exhaust portion 50 (FIG. 2) which blows air outwardly through the upper portion of the louver 32 also aids to clear the airspace immediately above the lower intake portion 52 (FIG. 2) of louver 32 of rain and other contaminants which may be otherwise pulled into the lower intake portion 52 by the lower fan. For purpose of this description, the term contaminants should be understood to mean rain, snow or other weather elements in addition to other elements which may be found in the outside air. Thus, the present embodiment utilizes a louver 32 having fin characteristics which aid to inhibit rain from entering the window fan system 10. The arrangement of an upper fan system 80 blowing outwardly and a lower fan 74 pulling air inwardly aids to blow rain away from the lower portion of louver 32 inhibiting rainwater from entering the window fan system 10 during use. Additionally, any rainwater which passes through the rear louver 32 may be impinged on the dam 60 adjacent the lower intake fan 74 or alternatively slowed by the dam 60 causing the water to fall or drain into the well 62.

As shown near the bottom of the window fan system 10, and between the first and second struts 45,46, the dam 60 has an upper surface 61 which generally slopes from an upper point closer to fan 74 to a lower point near the louver 32. The dam 60 receives some water which passes through the louver 32. Typically, the flow path of the water may be interrupted by the louvers 32 and this disruption in velocity causes the water droplets to fall onto the upper surface onto the dam 60. The slope of dam 60, in combination with gravity, causes water to drain down this dam slope into a well 62 (FIG. 6).

Moving away from the louver 32, beyond the dam 60, an intake fan assembly 70 is depicted. The fan assembly 70 includes a motor 72 which may be a 120 Volt motor having a high speed of approximately 1425 RPM, a medium speed of approximately 1322 RPM, and a low speed of approximately 1184 RPM. Connected to the fan motor 72 is a blower or fan 74. The blower or fan 74 may be a centripetal fan which draws air into the top portion beneath the partition 38. Alternatively, various types of fans may be used, for example centrifugal, tangential or cross-flow fans. The blower 74 is generally cylindrical in shape having a plurality of horizontal fins which may be slightly curved and connected by a plurality of axially aligned ribs. The blower 74 is operably connected to the fan motor 72 and spins about a central axis with the motor 72. In the views shown in FIGS. 5 and 6, the motor 72 rotates in a substantially counterclockwise direction which pulls air inwardly through the lower portion of louver 32 and moves the air upwardly through the blower housing 56 and expels the accelerated air through the room air exhaust 18. The blower housing 56 is connected to the partition 38 which separates the lower intake portion 52 (FIG. 2) from the upper exhaust portion 50 (FIG. 2).

Figure 7:
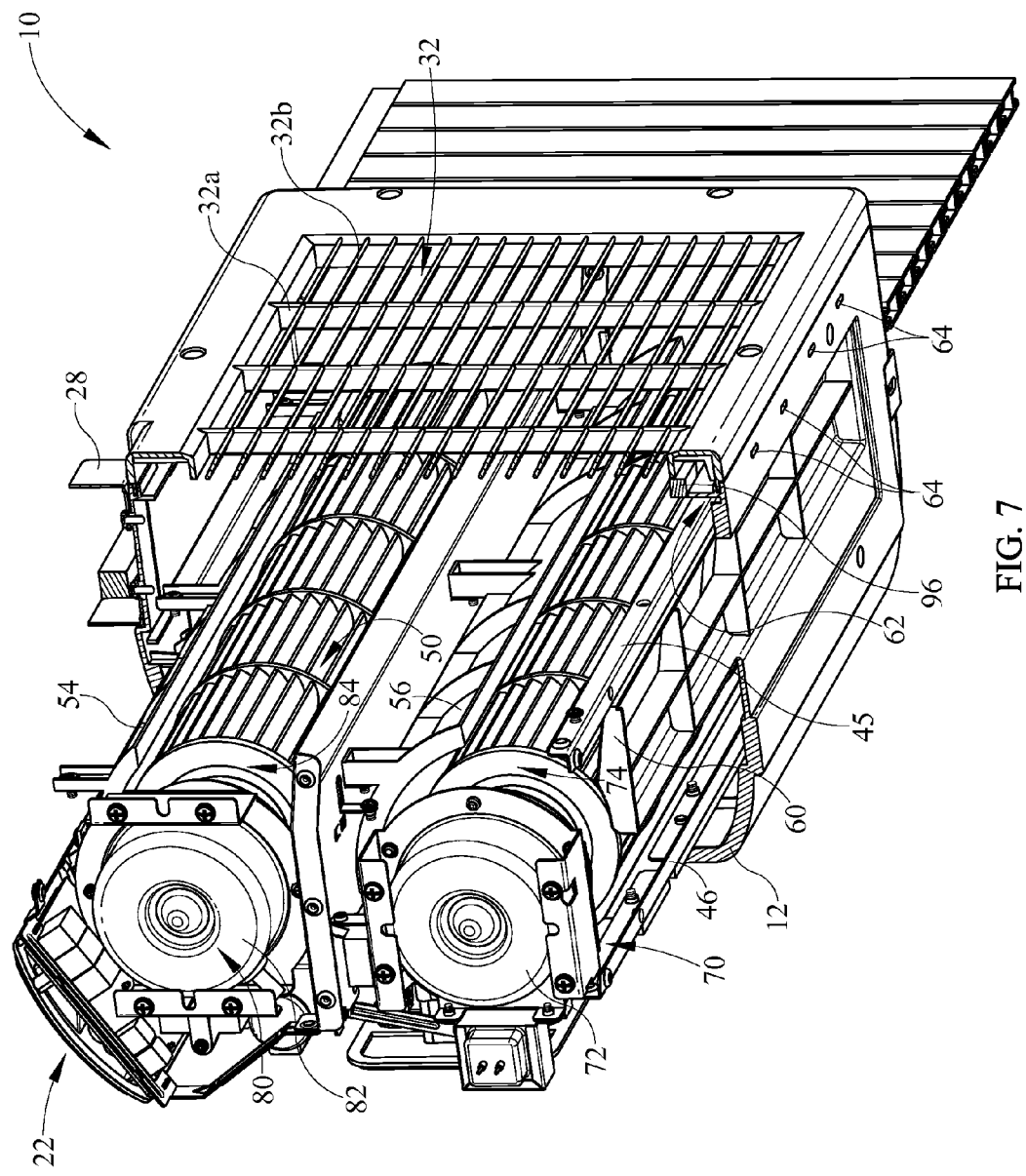
FIG. 7 is a partially sectioned lower perspective view of the window fan system.

Still referring to FIGS. 5, 6 and 7, the partition 38 includes a sloped portion closest to the rear louver 32. The sloped portion of the partition 38 also utilizes gravity to remove any water which may gather in this area of the fan and drains this water to the dam 60 or the well 62. At the downhill side of the dam 60 is a well 62. The function of the well 62 is to receive water which runs off the slope surface of the dam 60 and remove the water from the fan system 10. A plurality of apertures 64 are seen at a lower surface of the window fan unit 10. These apertures 64 function as drain holes and are located generally in the bottom of the well 62. A plurality of ribs 66 are positioned on the lower surface of the dam 60 which eliminates the need to make a solid dam 60 and saves weight while strengthening the part. As previously described the dam 60 may be separately formed or integrally formed with the housing 12, frame 40, or other parts.

Above the partition 38, an upper exhaust fan assembly 80 is positioned. Similar to the lower fan assembly 70, the upper exhaust fan assembly 80 comprises a fan motor 82 and a centripetal fan or blower 84. The upper fan assembly 80 removes air from the building interior through the room exhaust intake 30, through the blower 74 and out to atmosphere through the upper portion of the rear louver 32.

Figure 8:
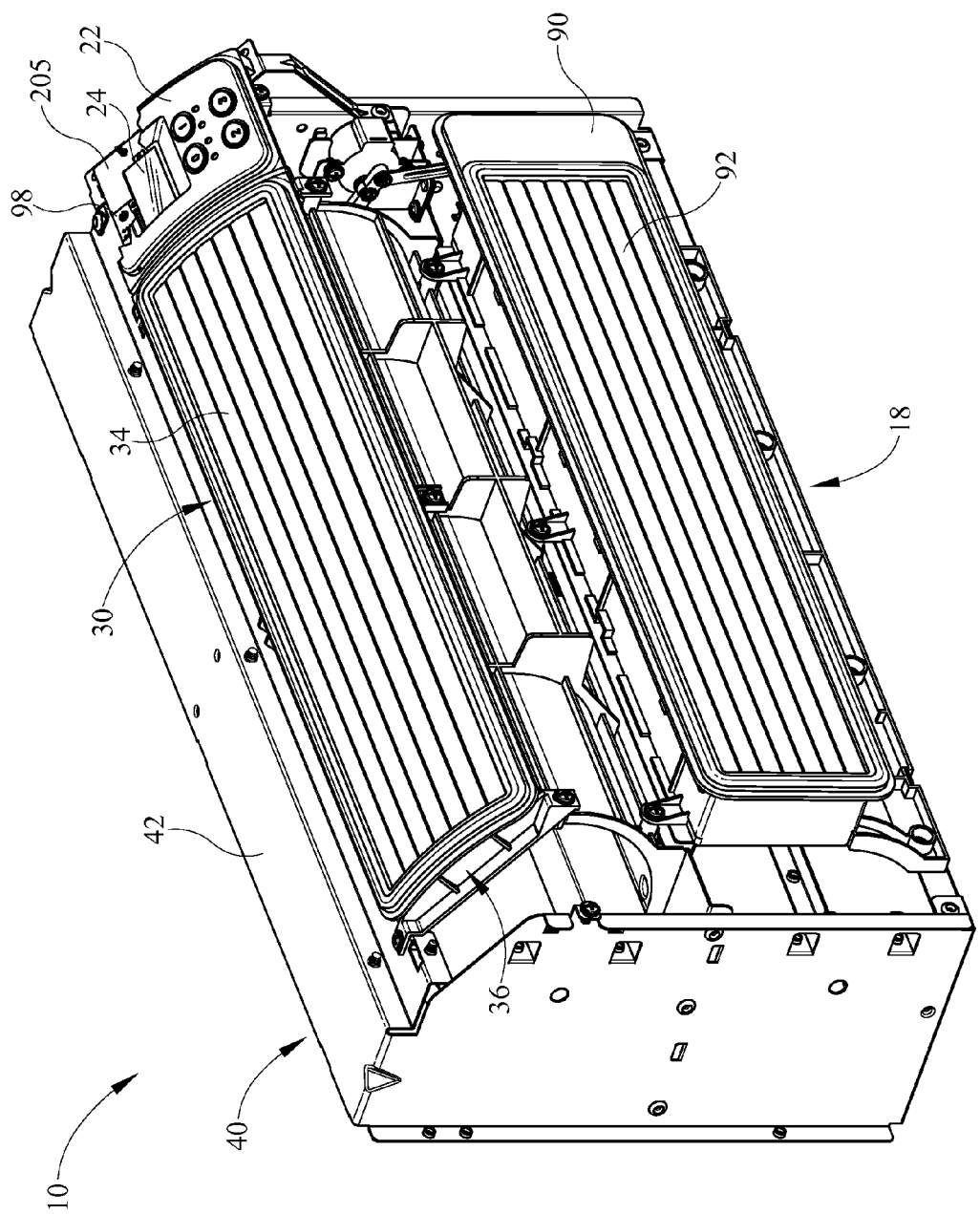
FIG. 8 is a front perspective view of the window fan unit with the housing structure removed.

Referring now to FIG. 8, the window fan unit 10 is depicted with the lower housing 12 and upper housing 20 removed. Extending from the frame 40 is a room exhaust intake 30 having a plurality of louvers 34 which are pivotally positioned within a louver frame 36. The louver frame 36 functions as a duct through which air passes from the room, through the room exhaust intake 30, louvers 34 and into the upper fan assembly 80. Beneath the louver frame 36 is the upper fan cowling 56 which is curved to proximate the curvature of the blower 84 and includes a plurality of stiffening ribs along the outer surface thereof.

Beneath the room exhaust intake 30, is the outside air exhaust 18, which also comprises a louver housing 90 and a plurality of pivotable louvers 92. The louver housing 90 also functions as a duct adjacent to the lower fan assembly 70 and allows air passage through the outside air exhaust 18 into the room or building where the window fan unit 10 is positioned.

Figure 9:
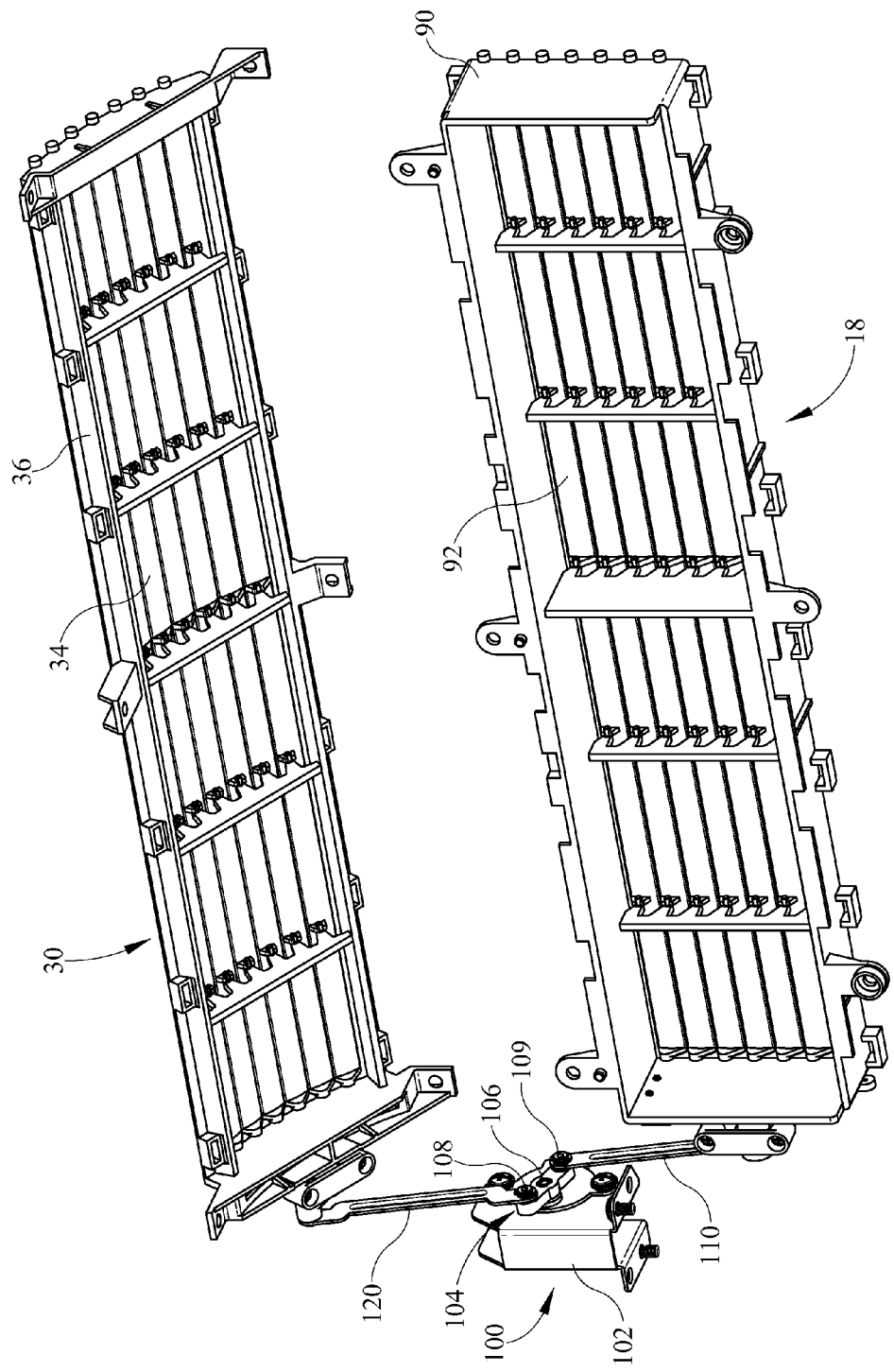
FIG. 9 is a rear perspective of the room air exhaust and room air intake including linkage removed from the window fan system.

Referring now to FIG. 9, a perspective view of the room exhaust intake 30 and the outside air exhaust 18 is shown in a rear perspective view through which air passes from a building interior to the outside of the building. The upper louver frame 36 includes a plurality of louvers 34 positioned therein. The louvers 34 may be pivoted open to allow air flow when the system 10 is in operation. Alternatively, when the window system 10 is not operating, the louvers 34 may be closed to inhibit flow of air from the interior of the room to the outside or vice versa depending on the temperature difference between the outside ambient air and the inside air temperature. The louver frame 36 includes a plurality of moldings and fastening apertures for connection to the frame 40 (FIG. 7) or other components of the system 10.

Beneath the room exhaust intake 30 is the outside air exhaust 18. The louver housing 90 defines a duct area through which air passes from the fan system 80 to the room interior. Within the lower housing 90 are a plurality of pivotally connected louvers 92 which also open and close depending on the state of the window fan system 10. The lower housing 90 also includes a plurality of moldings and apertures for connecting the lower housing 90 to the frame 40 or adjacent structure. As best seen in FIG. 8, positioned about the front area of the housings 36, 90 and louvers 34, 92 are trim elements which define portions of the outer housings 12, 20.

The louvers 34, 92 may, according to one embodiment, move independently of one another. Alternatively, in the exemplary embodiment depicted, and described hereinafter, a linkage system 100 is utilized to open and close the louvers 34, 92 simultaneously. The linkage system 100 comprises an actuated motor 102. An actuator arm 104 is operably connected to the motor with a pivot point 106 and first and second linkage connections 108, 109.

Figure 10:
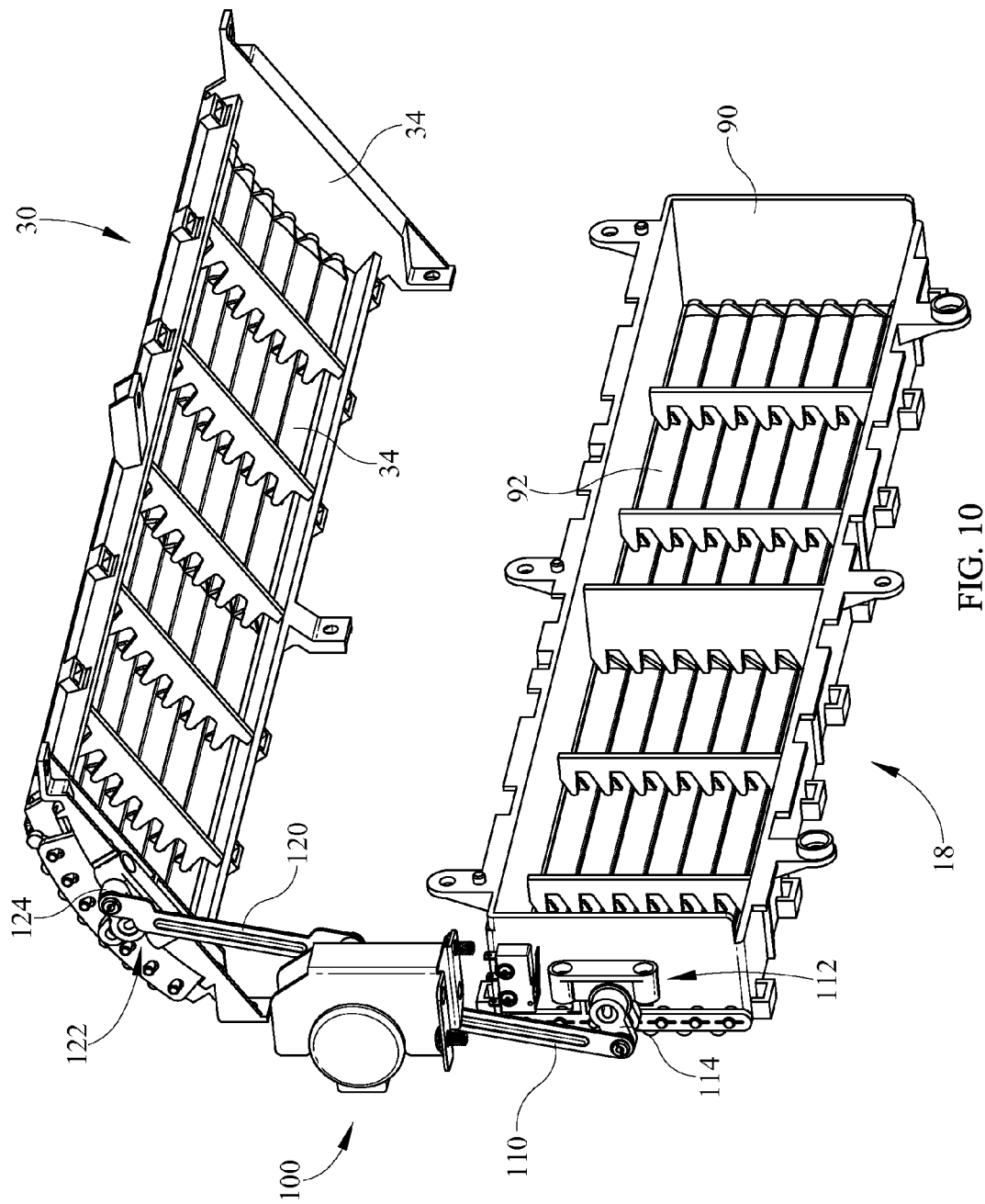
FIG. 10 is a second rear perspective view of the structure shown in FIG. 9.

Referring now to FIG. 10, a perspective view of the linkage system 100 is depicted. Connected to the arm 104 at pivot point 109 (FIG. 9) is a lower linkage 110. The lower linkage 110 connects to a lower louver pivot mechanism 112. This mechanism 112 includes at least one arm 114, connected to lower linkage 110. The upper linkage 120 extends to an upper pivot mechanism 122 having an arm 124. Both arms 114, 124 pivot to move the corresponding louvers 92, 34.

Figure 11:
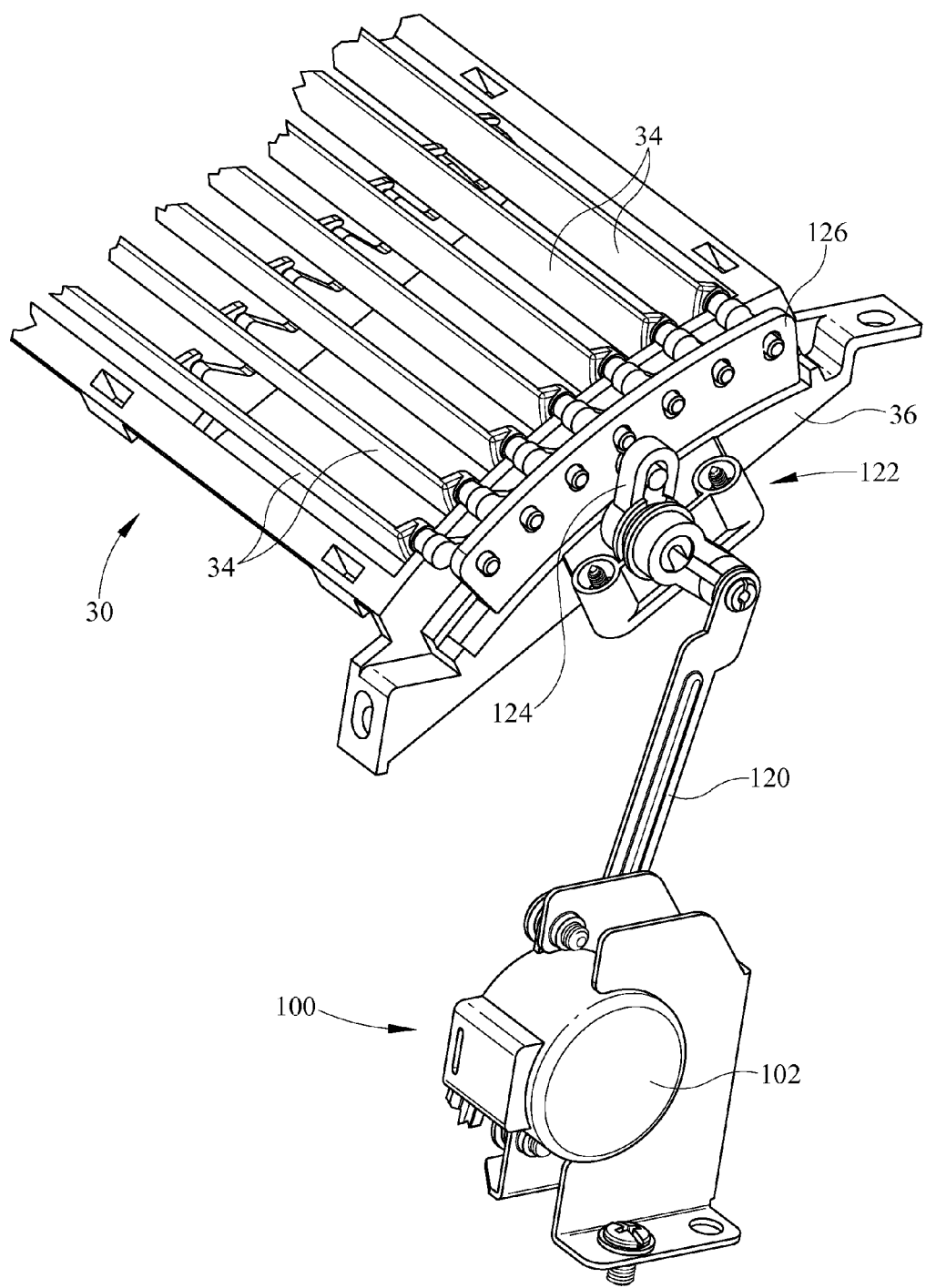
FIG. 11 is a perspective view of the linkage and louvers for the room air intake with the louvers in a first position.
Figure 12:
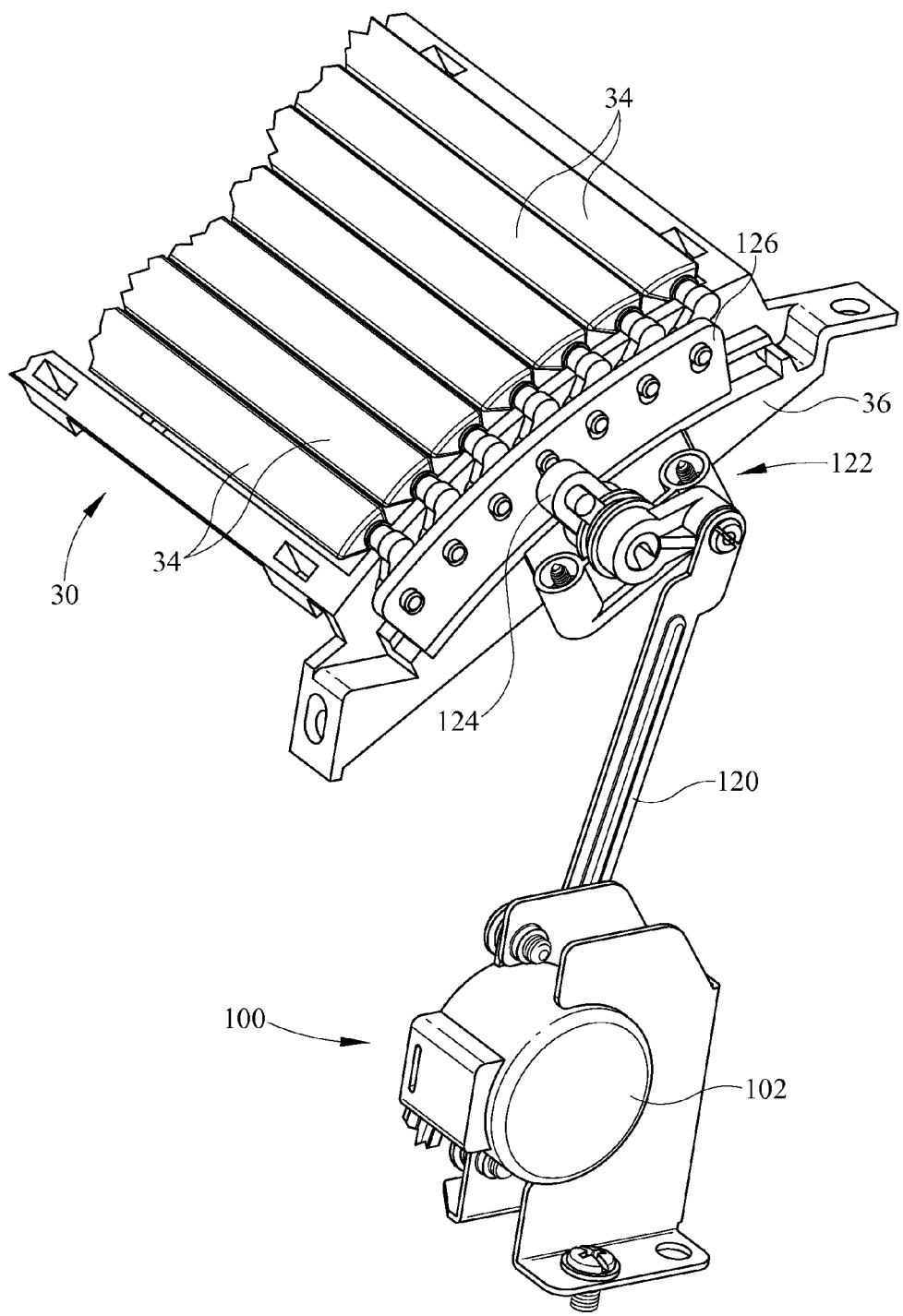
FIG. 12 is a perspective view of the linkage and louvers for the room air intake in a second position.

Referring now to FIGS. 11 and 12, perspective views of the pivot mechanism 122 are depicted with the louvers 34 in first and second positions. Arm 124 is generally v-shaped and pivotally connected to the louver frame 36. A slide member 126 is connected to the arm 124 and slides along a surface of the louver frame 136 as the arm 124 rotates with movement of linkage arm 120. Each of the louvers 34 are operably connected to the slide 126 so that movement of the arm 124 causes movement of the slide 126, and therefore movement of the louvers 34. In sum, according to the exemplary embodiment, the actuator motor 102 pivots each of the louvers 34 with a single motion via the arm 124 and slide member 126. As shown in FIG. 11, the louvers 34 are in an open position. As the arm 124 is rotated and the slide member 126 moves, the louvers 34 rotate to a closed position.

Figure 13:
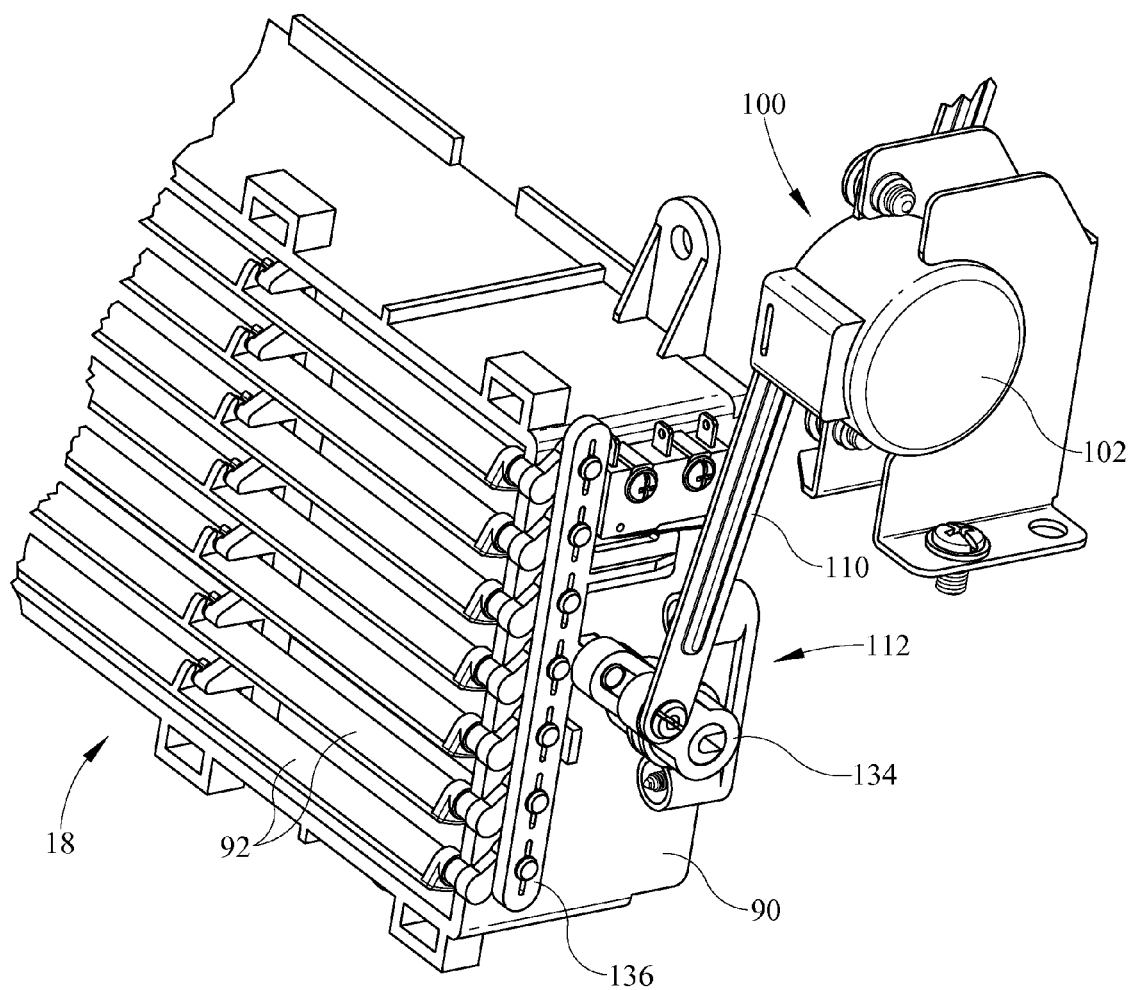
FIG. 13 is a perspective view of the linkage and louvers for the outside air exhaust with the louvers in a first position.
Figure 14:
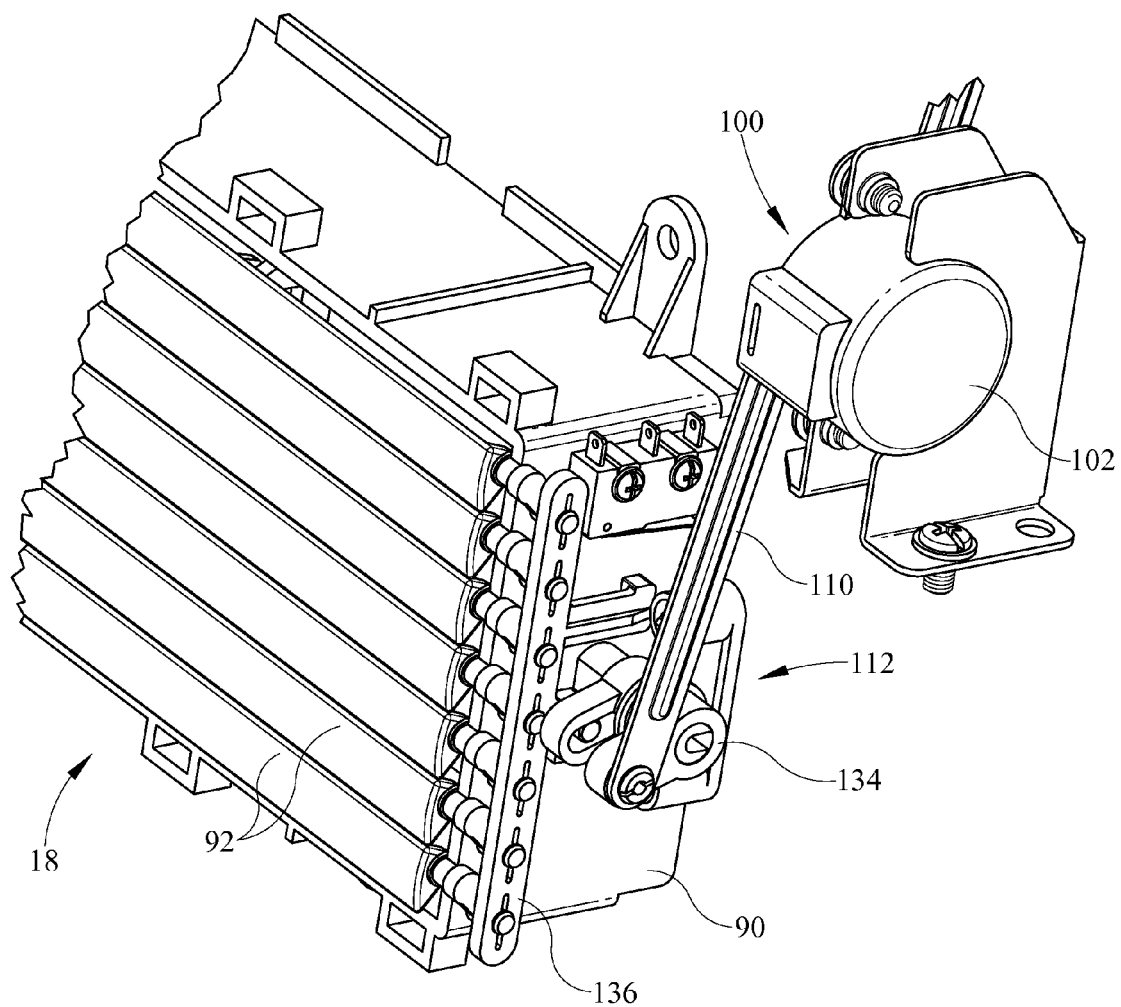
FIG. 14 is a perspective view of the linkage and louvers for the outside air exhaust with the louvers in a second position.
Figure 15:
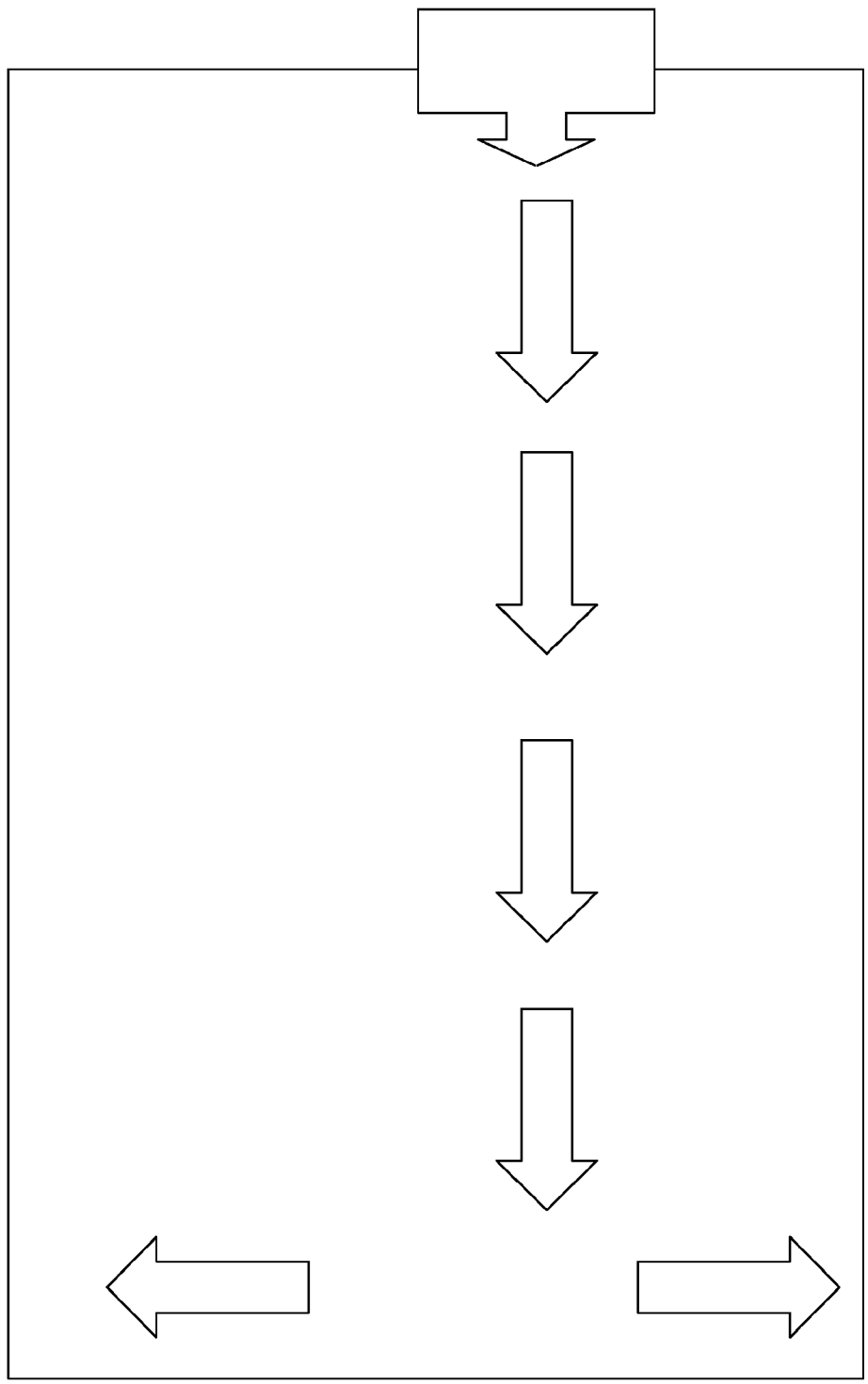
FIG. 15 is a side schematic of a prior art window fan having limited air movement.

Referring now to FIGS. 13 and 14, perspective views of the lower pivot mechanism 112 are depicted with the louvers in first and second positions. Depending from the actuator motor 102 is the lower linkage 110 which engages an arm 134. Extending from the lower housing 90 is a pivot structure about which the arm 134 rotates. Also connected to the arm 134 is a lower slide member 136. The plurality of louvers 92 are each pivotally connected to the slide member 136 so that rotation of the arm 134 causes pivotal movement, opening or closing, of the louvers 92.

Figure 16:
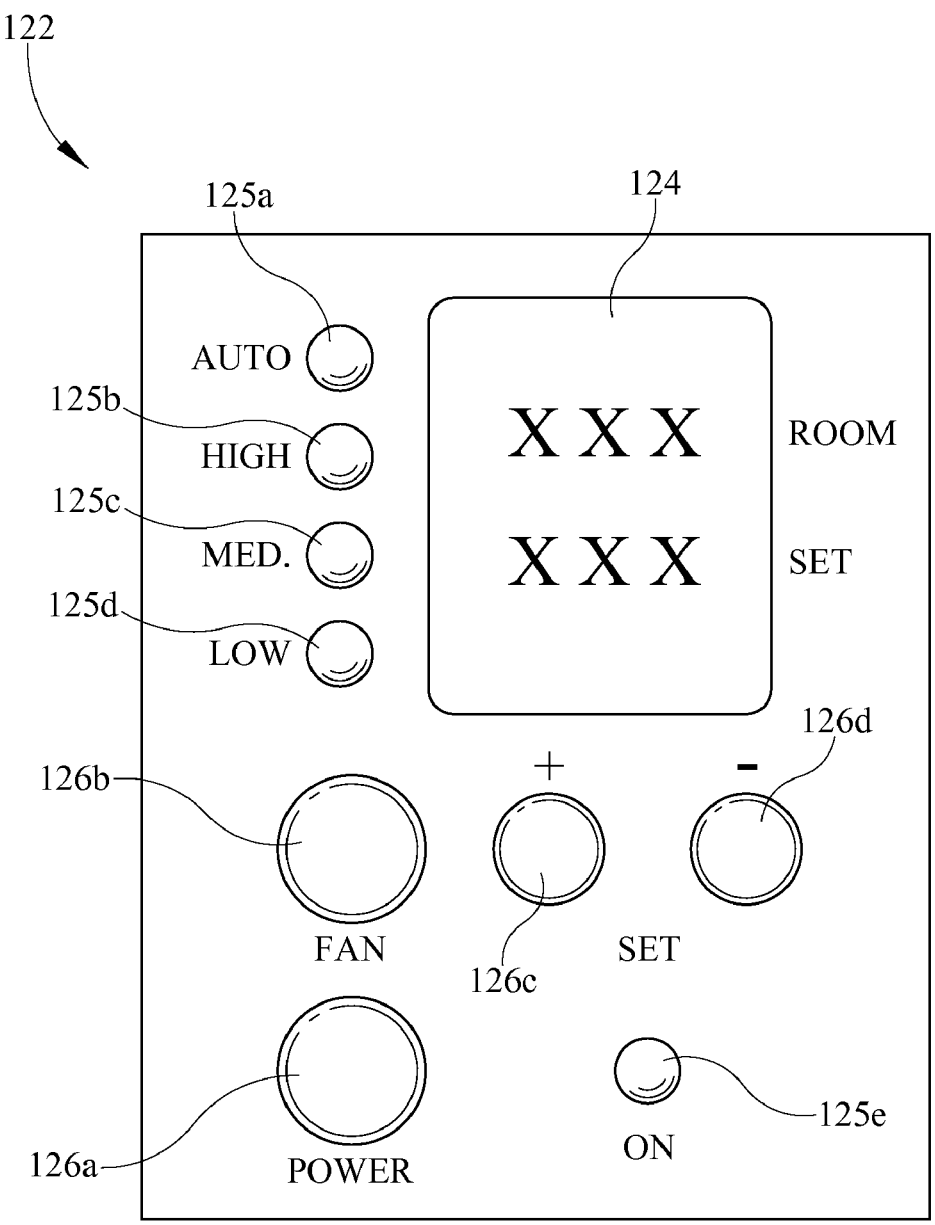
FIG. 16 is a top view of an embodiment of a control panel for use with the window fan system.

Referring now to FIG. 16, a top view of a second embodiment of a control panel 122 is depicted. Both control panels 22, 122 may be in electronic communication with the fan systems 70, 80 as well as linkage system 100 for controlling the window fan system 10. Control panel 122 may be located, for example, in a similar location as control panel 22 on window fan system 10. Control panel 122 includes a display 124 that provides an area for displaying a current dry bulb temperature of the room or interior air and an area for displaying the current set point temperature that has been selected by a user. A power push button 126a is provided to enable a user to selectively power window fan system 10 and a fan push button 126b is provided to enable a user to cause lower fan 74 and upper fan 84 to be set to a low, medium, high, or automatic setting. AUTO LED 125a, HIGH LED 125b, MED LED 125c, and LOW LED 125d are selectively illuminated to convey to a user which setting is selected for lower fan 74 and upper fan 84. Similarly, ON LED 125e is illuminated when the window fan system 10 is powered on to convey to a user that it is powered. A set point "+" button 126c and a set point "−" button 126d are provided to enable a user to increment the set point upwardly or downwardly, respectively. The area of display 124 for displaying the current set point temperature conveys to a user the currently selected set point.

Figure 17:
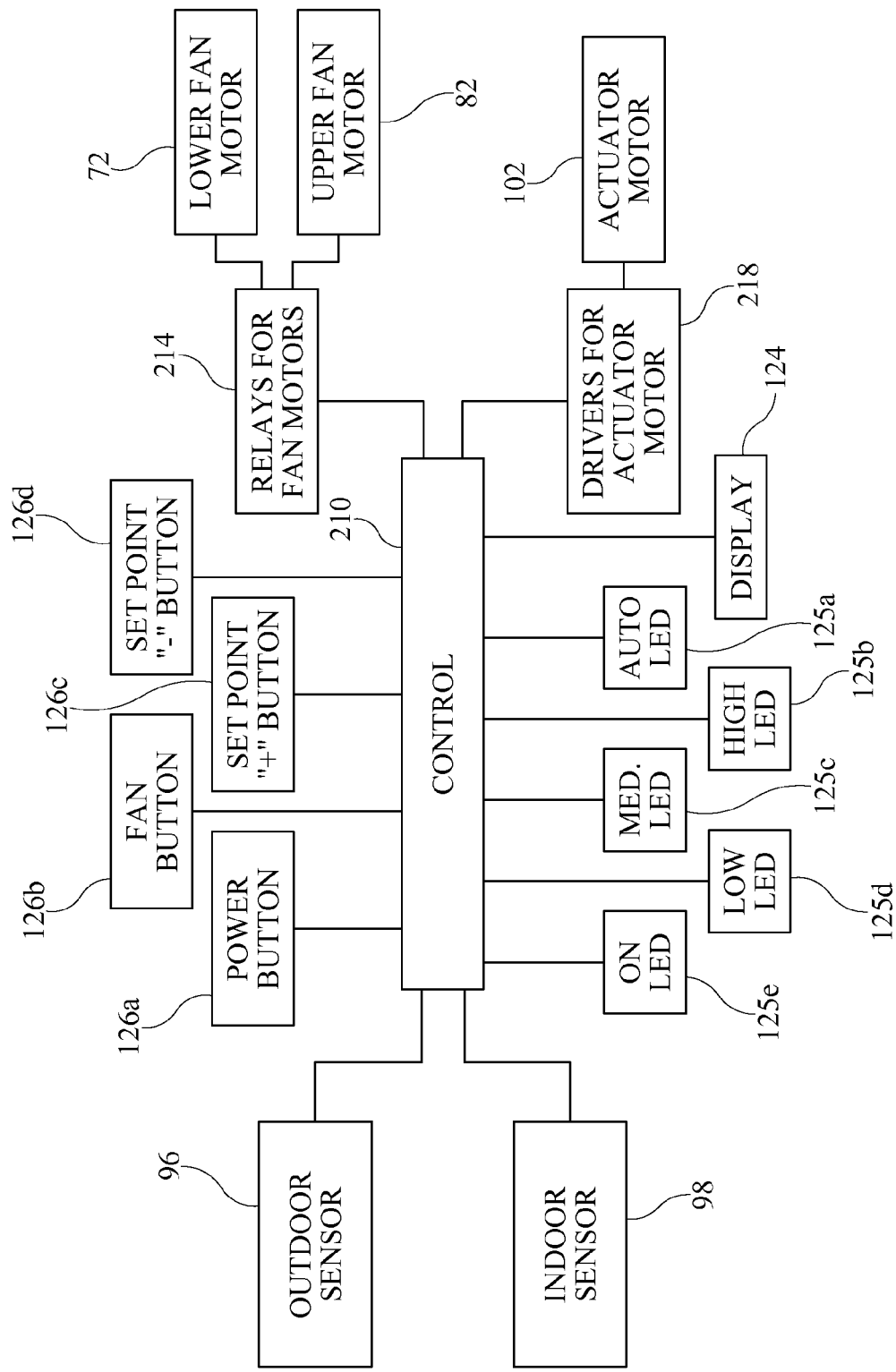
FIG. 17 is a schematic representation of an embodiment of a control system for a window fan system.

Referring now to FIG. 17, a schematic representation of an embodiment of a control system for a window fan is depicted. Power button 126a, fan button 126b, set point "+" button 126c, and set point "−" button 126d of control panel 122 are in selective electrical communication with controller 210, causing one or more signals to be sent to controller 210 when they are actuated. Controller 210 is also in electrical communication with AUTO LED 125a, HIGH LED 125b, MED LED 125c, LOW LED 125d, and ON LED 125e of control panel 122 and is programmed to selectively illuminate the LEDs based on input received from a user via power button 126a, fan button 126b, set point "+" button 126c, and/or set point "−" button 126d. Outdoor sensor 96 and indoor sensor 98 are also in electrical communication with controller 210 and may communicate one or more signals to controller 210 that are indicative of one or more characteristics of exterior air and interior air, respectively. Such characteristics include, without limitation, dry bulb temperature, wet bulb temperature, absolute humidity, specific humidity, relative humidity, pressure, and/or dew point temperature. Controller 210 is also in electrical communication with relays 214 for lower fan motor 72 and upper fan motor 82 and drivers 218 for actuated motor 102. The relays 214 are in electrical communication with lower fan motor 72 and upper fan motor 82 and can be selectively activated to cause lower fan motor 72 and upper fan motor 82 to be driven at a desired speed of a plurality of speeds. In some embodiments three relays are provided and may be selectively activated to drive lower fan motor 72 and upper fan motor 82 at either a low, medium, or high speed. The drivers 218 are in electrical communication with actuated motor 102 and may be selectively activated to accurately control actuated motor 102 and, resultantly, louvers 34 and 92. In some embodiments four driver channels may be provided in electrical communication with actuated motor 102 and may be selectively activated to provide full stepping or half stepping of the actuated motor 102.

In some embodiments Power button 126a, fan button 126b, set point "+" button 126c and set point "−" button 126d may be membrane type buttons that engage a corresponding switch on a circuit board adjacent the control panel 122 when actuated. The circuit board may also include the controller 210, AUTO LED 125a, HIGH LED 125b, MED LED 125c, LOW LED 125d, ON LED 125e, display 124, relays 214 for lower fan motor 72 and upper fan motor 82, and/or drivers 218 for the actuated motor 102. The control may be a PIC microcontroller model number PIC 18LF4331-1/PT, the actuator motor 102 may be a PM Step Motor 24BYJ model manufactured by Best Electronics Industrials Co., Ltd., and outdoor sensor 96 and indoor sensor 98 may be Relative Humidity and Temperature Modules HTG3500 Series manufactured by Measurement Specialties. Referring briefly to FIGS. 5-7, outdoor sensor 96 may be located just inside louver 32 near the base of louver 32 and strut 45. The outdoor sensor 96 is located near lower intake portion 52 so as to be appropriately exposed to exterior air. Referring briefly to FIG. 8 where a portion of control panel 22 is shown cut away, and to FIGS. 5 and 6, indoor sensor 98 may be located on a circuit board 205 adjacent the control panel 22 in a position so as to be exposed to the interior air and be relatively unaffected by any heat generated by other components attached to the circuit board 205. In FIGS. 1 and 5 apertures 23 are shown that extend through control panel 22 to enable indoor sensor 98 to be appropriately exposed to indoor air. Outdoor sensor 96 and indoor sensor 98 may be located elsewhere on window fan system 10 or may be located remote from window fan system 10, so long as they are located to be responsive to one or more characteristics of the exterior air and interior air, respectively. Outdoor sensor 96 and indoor sensor 98 may be in wired or wireless electronic communication with electronic controller 210.

Figure 18:
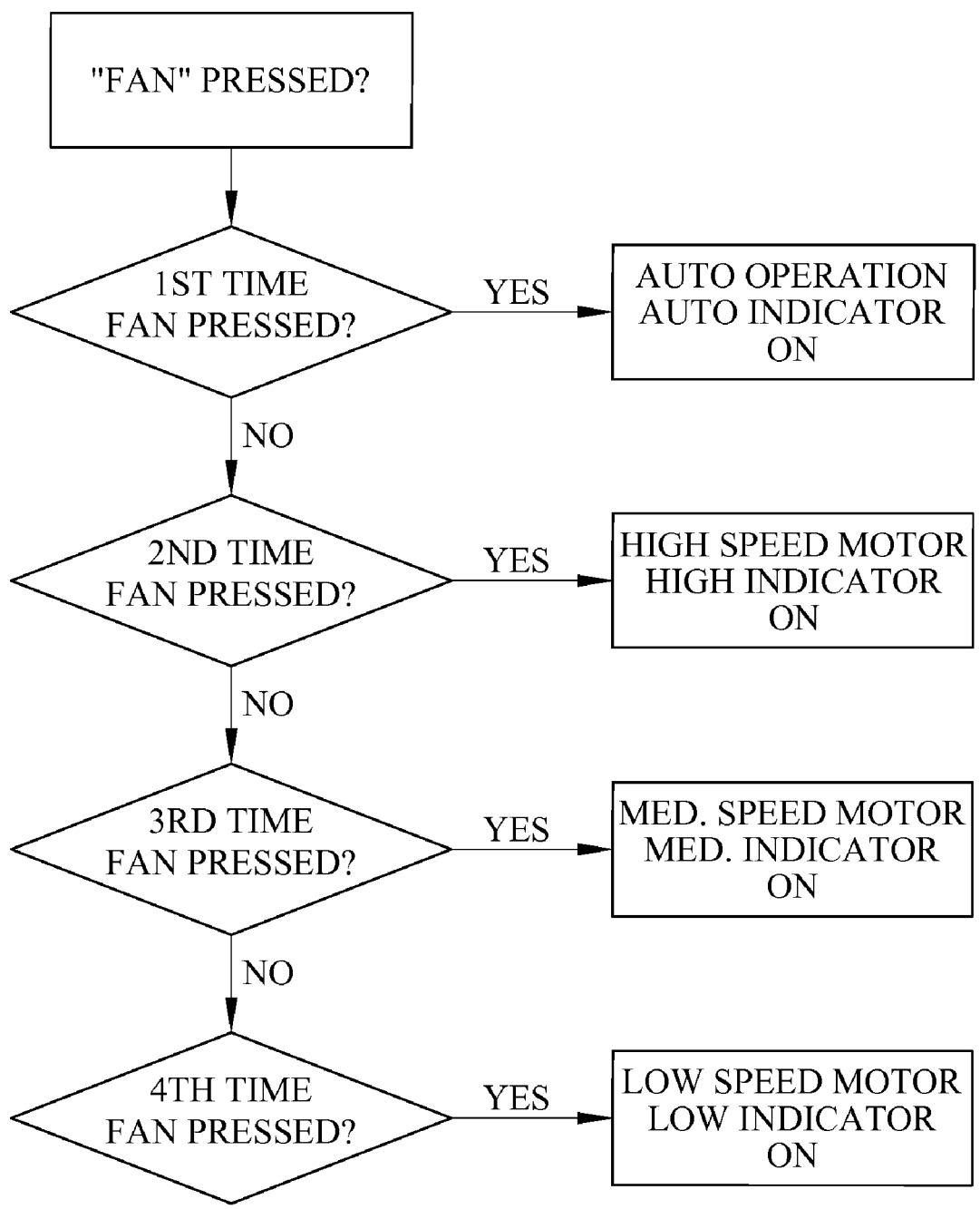
FIG. 18 is a flow diagram of an embodiment of the generalized logic of a control when a fan button of the window fan system is actuated by a user.

Referring now to FIG. 18, a flow diagram shows an embodiment of the generalized logic of controller 210 when fan button 126b is actuated by a user. If it is the first time fan button 126b has been pressed, the controller 210 causes AUTO LED 125a to be illuminated and controller 210 automatically operates the window fan system 10. An embodiment of the automatic operation of the window fan system is shown in detail in FIG. 20 and described in detail hereinafter. If it is the second time fan button 126b has been pressed, the controller 210 causes HIGH LED 125b to be illuminated, communicates with relays 214 to cause them to all be activated, causing lower fan motor 72 and upper fan motor 82 to operate at a high speed. Controller 210 also communicates with drivers 218 to ensure actuated motor 102 is appropriately stepped to place louvers 34 and 92 in an open position to allow airflow through window fan system 10. If it is the third time fan button 126b has been pressed, the controller 210 causes MED LED 125c to be illuminated, communicates with relays 214 to cause two relays to be activated, causing lower fan motor 72 and upper fan motor 82 to operate at a medium speed. Controller 210 also communicates with drivers 218 to ensure actuated motor 102 is appropriately stepped to place louvers 34 and 92 in an open position to allow airflow through window fan system 10. If it is the fourth time fan button 126b has been pressed, the controller 210 causes LOW LED 125d to be illuminated, communicates with relays 214 to cause a single relay to be activated, causing lower fan motor 72 and upper fan motor 82 to operate at a low speed. Controller 210 also communicates with drivers 218 to ensure actuator motor 102 is appropriately stepped to place louvers 34 and 92 in an open position to allow airflow through window fan system 10.

Figure 19:
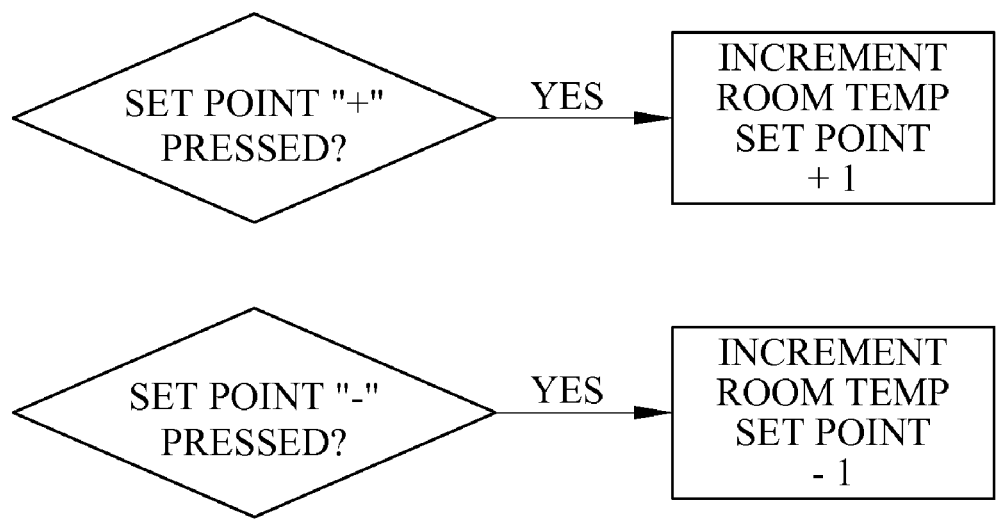
FIG. 19 is a flow diagram of an embodiment of the generalized logic of a control when a set point adjustment button of the window fan system is actuated by a user.

Referring now to FIG. 19, a flow diagram shows an embodiment of the generalized logic of controller 210 when set point "+" button 126c is actuated by a user and when set point "−" button 126d is actuated by a user. If the set point "+" button 126c is actuated controller 210 increments the currently stored set point up by one degree. The controller 210 also causes the area of display 124 that displays the current set point temperature to be updated to reflect the current set point temperature selected. If the set point "−" button 126d is actuated controller 210 increments the currently stored set point down by one degree. The controller 210 also causes the area of display 124 that displays the current set point temperature to be updated to reflect the current set point temperature selected. In alternative embodiments increments smaller or larger than one degree may be used.

Figure 20:
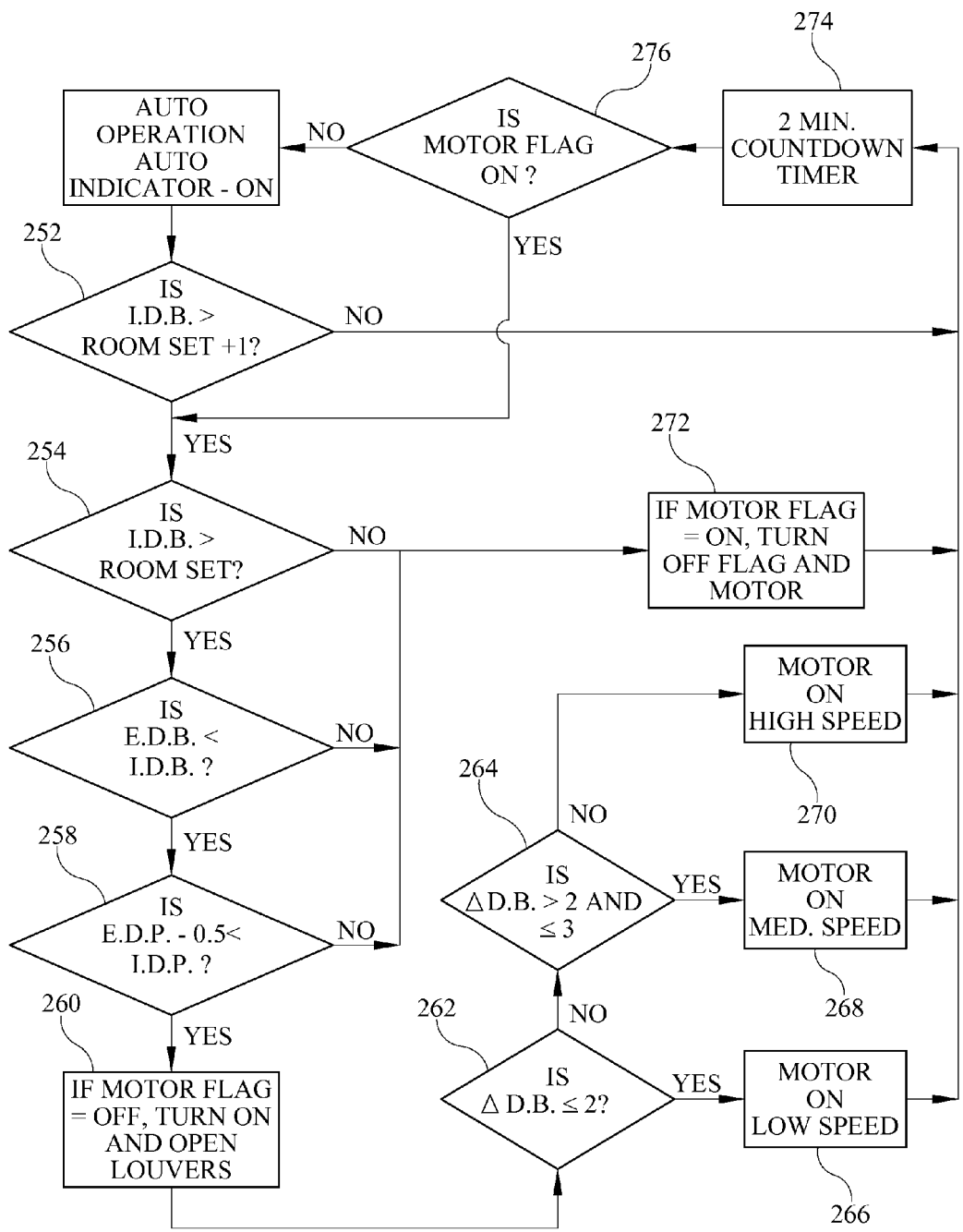
FIG. 20 is a flow diagram of an embodiment of the generalized logic of a control when automatically operating the window fan system.

Referring now to FIG. 20, a flow diagram shows an embodiment of the generalized logic of controller 210 automatically operating the window fan system 10. In the flow diagram of FIG. 20 interior dry bulb temperature (I. D. B.), exterior dry bulb temperature (E. D. B.), interior dew point (I.

D. P), and exterior dew point (E.D.P.) are analyzed by controller 210. In some embodiments indoor sensor 98 and outdoor sensor 96 supply signals to controller 210 that are indicative of measured interior and exterior dry bulb temperatures and relative humidity levels and controller 210 calculates an interior and exterior dew point that correspond to the measured interior and exterior dry bulb temperatures and relative humidity levels. In some embodiments controller 210 could calculate dew points by referencing a table, such as a table containing dry bulb temperatures, relative humidity levels, and dew point temperatures to determine a dew point temperature that corresponds to the measured dry bulb temperature and relative humidity level. In some embodiments controller 210 could calculate dew points by using one or more formulas. For example, the dew point could be calculated using the formula: Dew Point Temperature=[(17.271*Dry Bulb Temperature)/(237.7+Dry Bulb Temperature)]+ln (Relative Humidity/100), where the temperatures are in degrees Celsius and "ln" refers to the natural logarithm.

In other embodiments indoor sensor 98 and outdoor sensor 96 could measure alternative or additional characteristics of the interior and exterior air and supply signals to controller 210 indicative of such characteristics. Such characteristics include, without limitation, dry bulb temperature, wet bulb temperature, absolute humidity, specific humidity, relative humidity, pressure, and/or dew point temperature. Controller 210 could then use these alternative or additional characteristics to compare, either directly or indirectly, exterior and interior dry bulb temperatures and exterior and interior dew points for use in the automatic operation of the window fan system 10. For example, instead of measuring interior and exterior relative humidity, determining the interior and exterior dew point from the relative humidity measurements, and directly comparing the interior and exterior dew point, interior and exterior relative humidity could be measured, interior and exterior specific relative humidity determined from the relative humidity measurements, and interior and exterior specific relative humidity directly compared. Comparison of the exterior specific humidity and interior specific humidity may indirectly indicate the exterior dew point is less than the interior dew point. For example, if the exterior specific humidity is less than the interior specific humidity it may indirectly indicate that the exterior dew point is less than the interior dew point. Other characteristics of exterior and/or interior air may be measured and analyzed to directly or indirectly determine if the exterior dew point is less than an interior dew point. Temperatures can be set, measured, calculated, and/or displayed in Celsius and/or Fahrenheit as desired.

If automatic operation of the window fan system 10 has been chosen by a user, at step 252 controller 210 determines if the interior dry bulb temperature as indicated by indoor sensor 98 is greater than the current set point temperature plus one degree. Comparing the interior dry bulb temperature to the current set point temperature plus one degree at this point in the flow diagram prevents excessive cycling of the lower fan motor 72 and upper fan motor 82. If at step 252 the interior dry bulb temperature is determined to be greater than the current set point temperature plus one degree, at step 254 controller 210 determines if the interior dry bulb temperature is greater than the current set point. If the interior dry bulb temperature is greater than the current set point, at step 256 controller 210 determines if the exterior dry bulb temperature is less than the interior dry bulb temperature. If the exterior dry bulb temperature is less than the interior dry bulb temperature, at step 258 controller 210 determines if the exterior dew point minus five tenths is less than the interior dew point.

If so, at step 260 then the controller 210 turns the motor flag on and opens louvers 34 and 92.

The controller 210 then determines at step 262 if the difference between the interior dry bulb temperature and the current set point temperature (ΔD.B.) is less than or equal to two. If so, at step 266 the controller 210 activates the necessary relays to drive the lower fan motor 72 and upper fan motor 82 at low speed. If the difference between the interior dry bulb temperature and the current set point temperature is not less than or equal to two, the controller 210 determines at step 264 if the difference between the interior dry bulb temperature and the current set point temperature is greater than two and less than or equal to three. If so, at step 268 the controller 210 activates the necessary relays to drive the lower fan motor 72 and upper fan motor 82 at medium speed. If the difference between the interior dry bulb temperature and the current set point temperature is not greater than two and less than or equal to three, then at step 270 the controller 210 activates the necessary relays to drive the lower fan motor 72 and upper fan motor 82 at high speed.

Once the controller 210 has activated the necessary controls to drive the lower fan motor 72 and upper fan motor 82 at low speed in step 266, medium speed in step 268, or high speed in step 270, a two minute countdown timer is started in step 274. After the two minute timer is completed the controller 210 checks to see if the motor flag is on in step 276 (the motor flag will be on if the conditions of steps 254, 256, and 258 were met in the previous loop). If the motor flag is on then controller 210 will proceed to determine if the conditions of steps 254, 256, and 258 continue to be met. If the conditions of steps 254, 256, and 258 are met, controller 210 will again check the difference between the interior dry bulb temperature and the current set point temperature at steps 262 and 264 to determine if the speed at which the lower fan motor 72 and upper fan motor 82 are being driven needs to be adjusted. If the conditions of steps 254, 256, or 258 are not met than at step 272 the motor flag will be turned off if it is on, lower fan motor 72 and upper fan motor 82 will also be turned off, and then the two minute timer of step 274 executed. Following execution of the two minute timer, the process will proceed to step 252 (since the motor flag is no longer on) to determine if the indoor dry bulb temperature is greater than the current set point temperature plus one degree. If the interior dry bulb temperature is not greater than the current set point temperature plus one degree, controller 210 again executes a two minute timer at step 274 and after the timer has run again proceeds to step 252 to determine if the indoor dry bulb temperature is greater than the current set point plus one degree.

Automatic operation of the window fan system 10 will continue until a user chooses a different fan setting through actuation of fan button 126b or powers the window fan system down through actuation of power button 126a. Automatic operation of the window fan system 10 brings exterior air into an interior area and exhausts interior air to an exterior area when doing so would be advantageous in cooling the interior area as desired by a user. Automatic operation of the window fan system 10 may result in energy savings without requiring consistent monitoring by a user and without the need to sync the window fan system 10 with an air conditioner or other device.

The methods and control systems described herein, as well as variations thereof, may be implemented in an air conditioning unit that includes a compressor and one or more fans that draw exterior air into an interior area. Such an air conditioning unit may also include one or more fans that exhaust interior air to an exterior area. The compressor of the air conditioning unit may be selectively deactivated when bringing exterior air into an interior area and/or exhausting interior air to an exterior area would be advantageous in cooling the interior area. For example, a hotel room air conditioning unit or a window room air conditioner unit may be installed in a wall or window and extend between a room and the outside. The air conditioning unit may include an interior sensor that monitors one or more characteristics of the air in the hotel room and an outside sensor that monitors one or more characteristics of the outside air. The air conditioning unit may include a fan that draws air from the outside and into the hotel room. Such a fan may be the same as, or distinct from, a primary air conditioning fan that blows air into the hotel room that has first been cooled through an evaporator or other device. The air conditioning unit may be programmed to utilize the compressor to cool air being blown from the air conditioning unit into a room interior when the desired set point is less than the current room interior temperature and bringing exterior air into the room interior would not be advantageous in cooling the interior area. The hotel room air conditioning unit may further be programmed to deactivate the compressor and provide exterior air into the room interior when the desired cooling temperature is less than the current room interior temperature and bringing exterior air into the room interior would be advantageous in cooling the interior area.

The foregoing description of structures and methods has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A control system for a window fan, the window fan having a fan for communicating air between an interior area having interior air and an exterior area having exterior air, comprising:
    an electronic controller in electrical communication with said fan;
    a control panel having a user selectable set point input, said set point input in electrical communication with said electronic controller and providing a user selected set point to said electronic controller;
    an indoor sensor located so as to be responsive to at least one characteristic of said interior air, said indoor sensor in electrical communication with said electronic controller and communicating said at least one characteristic of said interior air to said electronic controller;
    an outdoor sensor located so as to be responsive to at least one characteristic of said exterior air, said outdoor sensor in electrical communication with said electronic controller and communicating said at least one characteristic of said exterior air to said electronic controller;
    wherein said window fan is operable in an automatic mode, wherein in said automatic mode said electronic controller causes said fan to be activated when:
    said at least one characteristic of said interior air indicates a dry bulb temperature of said interior air is greater than said set point,
    said at least one characteristic of said exterior air indicates a dry bulb temperature of said exterior air is less than said dry bulb temperature of said interior air, and
    said at least one characteristic of said exterior air indicates a dew point of said exterior air is less than a dew point of said interior air as indicated by said at least one characteristic of said interior air;
    wherein said fan may be driven at variable speeds;
    wherein the speed of said fan corresponds to a differential between said set point and said indoor dry bulb temperature;
    a second fan, wherein said second fan is an exhaust fan for expelling said interior air into an exterior area and wherein said fan is an intake fan for drawing exterior air into an interior area, and wherein the speed of said second fan corresponds to a differential between said set point and said indoor dry bulb temperature;
    wherein said fan and said second fan may be driven at low, medium, and high speeds; and
    wherein said electronic controller causes said fan and said second fan to be operated at said low speed when said differential between said set point and said indoor dry bulb temperature is within a first range, wherein said electronic controller causes said fan and said second fan to be operated at said medium speed when said differential between said set point and said indoor dry bulb temperature is within a second range greater than said first range, and wherein said electronic controller causes said fan and said second fan to be operated at said high speed when said differential between said set point and said indoor dry bulb temperature is within a third range greater than said second range.

2. The control system for a window fan of claim 1, wherein said second fan is disposed vertically above said fan when said window fan is installed.

3. A method of controlling a fan unit installable in an opening between an interior area and an exterior area, the fan unit having an intake fan for drawing exterior air into a building interior, the method comprising the steps of:
    providing an input device to allow a user to select a set point indicative of a minimum desired temperature of interior air;
    measuring at least one characteristic of said exterior air;
    measuring at least one characteristic of said interior air;
    activating said intake fan when:
        said at least one characteristic of said interior air indicates a dry bulb temperature of said interior air is above said set point,
        said at least one characteristic of said exterior air indicates a dry bulb temperature of said exterior air is less than said dry bulb temperature of said interior air, and
        said at least one characteristic of said exterior air indicates a dew point of said exterior air is less than a dew point of said interior air as indicated by said at least one characteristic of said interior air;
    wherein said at least one characteristic of said interior air includes an interior humidity measurement and wherein said at least one characteristic of said exterior air includes an exterior humidity measurement; and
    wherein said intake fan is a variable speed fan and wherein the step of activating said intake fan further includes determining a difference between said set point and said indoor dry bulb temperature and activating said intake fan at a first speed when said difference between said set point and said indoor dry bulb temperature is within a first range of numbers and activating said intake fan at a second speed greater than said first speed when said difference between said set point and said indoor dry bulb temperature is within a second range of numbers, wherein said second range of numbers contains numbers larger than said first range of numbers.

4. The method of claim 3, further comprising the step of deactivating said intake fan when said at least one characteristic of said interior air indicates a dry bulb temperature of said interior air is less than or equal to said set point.

5. The method of claim 3, further comprising the step of deactivating said intake fan when said at least one characteristic of said interior air indicates a dry bulb temperature of said interior air is less than said set point.

6. The method of claim 3, wherein said fan unit is an air conditioning unit that includes a housing having an exterior side for positioning in said exterior area and an interior side for positioning in said interior area; said air conditioning unit further including a compressor; and wherein the method further comprises the step of deactivating said compressor when:
said at least one characteristic of said interior air indicates a dry bulb temperature of said interior air is above said set point,
said at least one characteristic of said exterior air indicates a dry bulb temperature of said exterior air is less than said dry bulb temperature of said interior air, and
said at least one characteristic of said exterior air indicates a dew point of said exterior air is less than a dew point of said interior air as indicated by said at least one characteristic of said interior air.

7. A method of controlling a fan unit, the fan unit having an intake fan for drawing exterior air through said fan unit into a building interior, an exhaust fan for expelling interior air through said fan unit into an exterior, and at least one louver assembly for selectively inhibiting airflow through said fan unit, the method comprising the steps of:
allowing a user to select a set point indicative of a minimum desired temperature of interior air;
measuring at least one characteristic of said exterior air;
measuring at least one characteristic of said interior air;
activating said intake fan, activating said exhaust fan, and opening said at least one louver assembly to allow airflow through said fan unit when:
said at least one characteristic of said interior air indicates a dry bulb temperature of said interior air is above said set point,
said at least one characteristic of said exterior air indicates a dry bulb temperature of said exterior air is less than said dry bulb temperature of said interior air, and
said at least one characteristic of said exterior air indicates a dew point of said exterior air is less than a dew point of said interior air as indicated by said at least one characteristic of said interior air;
wherein said intake fan and said exhaust fan are variable speed fans; and
wherein the step of activating said intake fan and said exhaust fan further includes determining a difference between said set point and said indoor dry bulb temperature and activating said intake fan and said exhaust fan at a first speed when said difference between said set point and said indoor dry bulb temperature is within a first range of numbers and activating said intake fan and said exhaust fan at a second speed greater than said first speed when said difference between said set point and said indoor dry bulb temperature is within a second range of numbers, wherein said second range of numbers contains numbers larger than said first range of numbers.

8. The method of claim 7, further comprising the step of deactivating said intake fan, deactivating said exhaust fan, and closing said at least one louver when said at least one characteristic of said interior air indicates a dry bulb temperature of said interior air is less than said set point.

9. The method of claim 8, further comprising the step of deactivating said intake fan when said at least one characteristic of said interior air indicate a dry bulb temperature of said interior air is less than said set point.

10. The method of claim 9, wherein said fan unit is an air conditioning unit that includes a housing having an exterior side for positioning in said exterior area and an interior side for positioning in said interior area; said air conditioning unit further including a compressor; and wherein the method further comprises the step of deactivating said compressor when:
said at least one characteristic of said interior air indicates a dry bulb temperature of said interior air is above said set point,
said at least one characteristic of said exterior air indicates a dry bulb temperature of said exterior air is less than said dry bulb temperature of said interior air, and
said at least one characteristic of said exterior air indicates a dew point of said exterior air is less than a dew point of said interior air as indicated by said at least one characteristic of said interior air.

11. The method of claim 7, wherein said at least one characteristic of said interior air includes an interior relative humidity measurement and wherein said at least one characteristic of said exterior air includes an exterior relative humidity measurement.

12. The method of claim 11, wherein said at least one characteristic of said interior air includes an interior dry bulb temperature measurement and wherein said at least one characteristic of said exterior air includes an exterior dry bulb temperature measurement; wherein an interior dew point is calculated from said interior dry bulb temperature measurement and said interior relative humidity measurement and an exterior dew point is calculated from said exterior dry bulb temperature measurement and said exterior relative humidity measurement; and wherein said interior dew point is compared to said exterior dew point to thereby determine if said dew point of said exterior air is less than said dew point of said interior air.

13. The method of claim 12, wherein said at least one characteristic of said interior air includes an interior dry bulb temperature measurement and wherein said at least one characteristic of said exterior air includes an exterior dry bulb temperature measurement; wherein an interior specific humidity level is calculated from said interior dry bulb temperature measurement and said interior relative humidity measurement and an exterior specific humidity level is calculated from said exterior dry bulb temperature measurement and said exterior relative humidity measurement; and wherein said exterior specific humidity level is compared to said specific humidity level to thereby indirectly determine if said dew point of said exterior air is less than said dew point of said interior air.

* * * * *